United States Patent [19]
Morris

[11] Patent Number: 6,118,193
[45] Date of Patent: Sep. 12, 2000

[54] ELECTROMAGNETIC MACHINE FOR PROVIDING A PROPULSIVE FORCE

[76] Inventor: Richard M. Morris, P.O. Box 1085, Goliad, Tex. 77963

[21] Appl. No.: 09/417,126

[22] Filed: Oct. 13, 1999

Related U.S. Application Data

[60] Provisional application No. 60/103,911, Oct. 13, 1998.

[51] Int. Cl.[7] .............................. H02K 7/01; H02K 21/20
[52] U.S. Cl. .......................... 310/74; 310/113; 310/267; 74/572
[58] Field of Search .................................... 310/74, 67 R, 310/113, 261, 267, 254, 89, 153; 29/596–598; 74/572

[56] References Cited

U.S. PATENT DOCUMENTS

| | | | |
|---|---|---|---|
| 4,144,467 | 3/1979 | Nakajima et al. | 310/49 R |
| 4,329,971 | 5/1982 | Kemeny et al. | 124/3 |
| 4,939,976 | 7/1990 | Minovitch | 244/63 |
| 5,065,060 | 11/1991 | Takahashi et al. | 310/74 |
| 5,093,313 | 3/1992 | Minovitch | 505/1 |
| 5,142,861 | 9/1992 | Schlicher et al. | 60/203.1 |
| 5,197,279 | 3/1993 | Taylor | 60/203.1 |
| 5,473,233 | 12/1995 | Stull et al. | 318/587 |
| 5,483,111 | 1/1996 | Kuznetsov | 310/12 |
| 5,628,253 | 5/1997 | Ozeki et al. | 104/292 |
| 5,653,175 | 8/1997 | Milligan | 104/138.1 |
| 5,705,871 | 1/1998 | Suzuki et al. | 310/156 |
| 5,717,316 | 2/1998 | Kawai | 322/46 |
| 5,905,321 | 5/1999 | Clifton et al. | 310/178 |

FOREIGN PATENT DOCUMENTS

| | | |
|---|---|---|
| 27 56 379 A1 | 6/1979 | Germany . |
| 2 132 322 | 7/1984 | United Kingdom . |

*Primary Examiner*—Clayton LaBalle
*Assistant Examiner*—Tran N Nguyen
*Attorney, Agent, or Firm*—Richard C. Litman

[57] ABSTRACT

An electromagnetic machine, for using electrical energy to generate a propulsive force, includes an inertia ring disposed within an outer casing. The inertia ring can rotate freely relative to the outer casing. The outer casing supports a pair of primary coils. The inertia ring carries a plurality of secondary magnetic coils thereon. There is a pair of brushes that energizes the secondary magnetic coils on either side of each of the primary coils, as the secondary coils move past the pairs of brushes. The primary coils are energized to attract the secondary coils on one side thereof while repelling the secondary coils on the other side thereof to thereby impart rotational movement to the inertia ring relative to the outer casing.

15 Claims, 23 Drawing Sheets

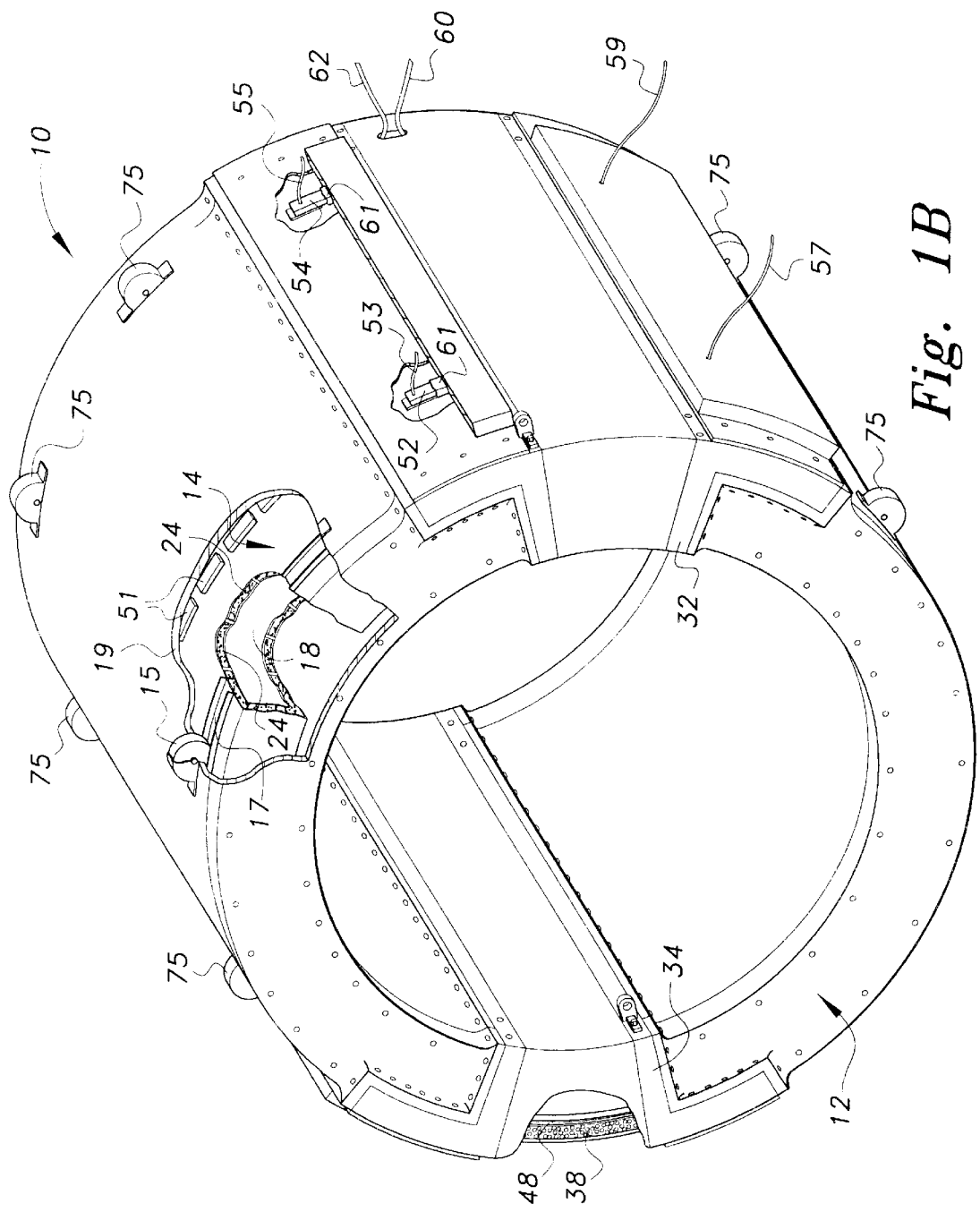

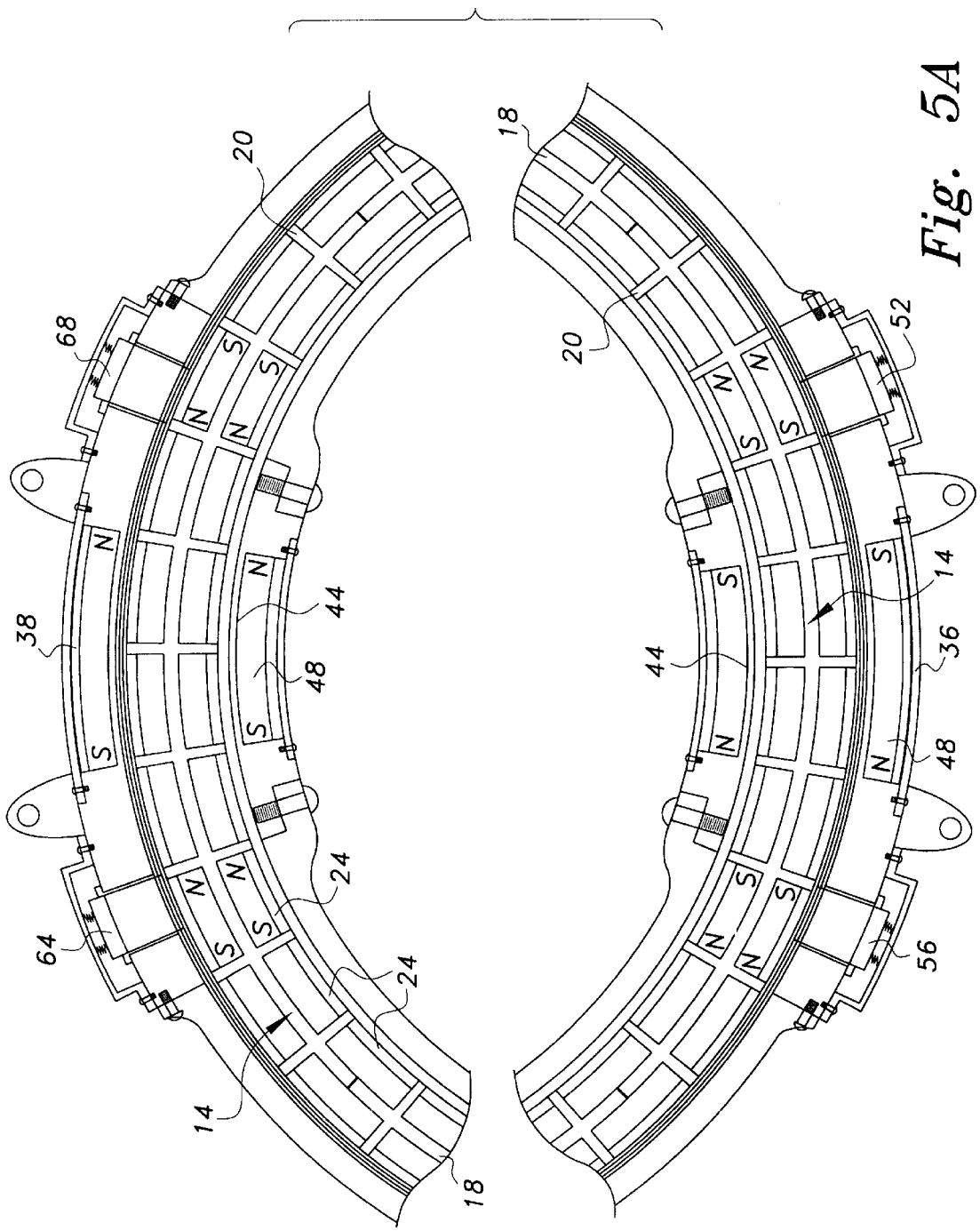

ELECTROMAGNETIC MACHINE FOR PROVIDING A PROPULSIVE FORCE

CROSS-REFERENCE TO RELATED APPLICATION

This application claims the benefit of U.S. Provisional Patent Application Ser. No. 60/103,911, filed Oct. 13, 1998.

BACKGROUND OF THE INVENTION

1. Field of the Invention

The present invention relates to electric machines and more particularly to electric machines which act to generate a propulsive force.

2. Description of Related Art

Machines that convert electrical energy to mechanical energy are commonplace throughout the modern world because electrical energy is one of the most convenient forms in which energy can be made available in a variety of circumstances. For this reason, the design of electromagnetic machines that convert electrical energy to mechanical energy continues to be an active area of investigation and development as evidenced by the art cited below.

U.S. Pat. No. 4,144,467, issued to Fumio Nakajima et al. on Mar. 13, 1979, discloses a pulse electric motor for use in watches and clocks. The motor of Nakajima et al. uses two permanent magnetic disks mounted on a shaft and independently excitable stator coils to cause rotation of the shaft.

U.S. Pat. No. 4,329,971, issued to George A. Kemeny et al. on May 18, 1982, discloses a rail gun for accelerating a projectile to high velocities.

U.S. Pat. Nos. 4,939,976, issued to Michael A. Minovitch on Jul. 10, 1990, and U.S. Pat. Nos. 5,093,313, issued to Michael A. Minovitch on Mar. 3, 1992, show an orbital launch system which uses the magnetic field generated by giant superconducting field coils to propel a launch vehicle having a superconducting dipole coil that several kilometers in diameter.

U.S. Pat. Nos. 5,142,861, issued to Rex L. Schlicher et al. on Sep. 1, 1992, shows an electromagnetic propulsion system based on an extremely low frequency antenna structure driven by a matched high current, pulsed power supply.

U.S. Pat. No. 5,197,279, issued to James R. Taylor on Mar. 30, 1993, shows an electromagnetic propulsion engine which uses rearwardly directed magnetic field energy to produce a reaction force which propels the engine, and a vehicle in which the engine is mounted, forward.

U.S. Pat. No. 5,473,233, issued to Mark A. Stull et al. on Dec. 5, 1995, shows an electromagnetic transportation system which uses wheeled vehicles propelled by a linear synchronous motor embedded in a dedicated guide way upon which the vehicles travel.

U.S. Pat. No. 5,483,111, issued to Stephen B. Kuznetsov on Jan. 9, 1996, and U.S. Pat. No. 5,628,253, issued to Masanori Ozeki et al. on May 13, 1997, relate to propulsion systems for use with magnetically levitated trains.

U.S. Pat. No. 5,653,175, issued to George Truett Milligan on Aug. 5, 1997, shows a vacuum highway and vehicle system wherein an electromagnetic propulsion system is incorporated into each vehicle for accelerating and decelerating the vehicles.

U.S. Pat. No. 5,705,871, issued to Yuzuru Suzuki et al. on Jan. 6, 1998, shows a pulse generator having a rotor made of permanent magnets and a stator having radially oriented coils.

U.S. Pat. No. 5,717,316, issued to Teruo Kawai on Feb. 10, 1998, shows an electric motor having radially oriented stator coils and a rotor with radially oriented permanent magnets.

German Patent Number 27 56 379, by Hans Keller, dated Jun. 21, 1979, shows an electromagnetic device that causes a lever arm to pivot.

U.K. Patent Application Number 2 132 322, by Carl John Heyne, dated Jul. 4, 1984, shows an electromagnetic projectile launcher which uses a conventional powder burning gun to initially boost the projectile.

None of the above inventions and patents, taken either singly or in combination, is seen to describe the instant invention as claimed. In particular, none of the above inventions and patents, taken either singly or in combination, teach or suggest a set of secondary coils arranged into a ring or a set of primary coils through which the set of secondary coils successively pass as the ring rotates.

SUMMARY OF THE INVENTION

The present invention is directed to an electromagnetic machine for using electrical energy to generate a propulsive force. The electromagnetic machine of the present invention includes an inertia ring disposed within an outer casing. The inertia ring can rotate freely relative to the outer casing. The outer casing supports a pair of primary coils. The inertia ring carries a plurality of secondary magnetic coils thereon. There is a pair of brushes that energizes the secondary magnetic coils on either side of each of the primary coils, as the secondary coils move past the pairs of brushes. The primary coils are energized to attract the secondary coils on one side thereof while repelling the secondary coils on the other side thereof to thereby impart rotational movement to the inertia ring relative to the outer casing.

Accordingly, it is a principal object of the invention to provide an electromagnetic machine that uses electrical energy to generate a propulsive force.

It is another object of the invention to provide an electromagnetic machine that uses the attraction and/or repulsion between a primary coil and a plurality of secondary coils to impart rotational movement to a ring relative to the primary coil.

It is a further object of the invention to provide an electromagnetic machine that can serve as a generally applicable prime mover.

Still another object of the invention is to provide an electromagnetic machine that can be used to launch payloads into space.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1B is a diagrammatic, partially cutaway perspective view of the electromagnetic machine of the present invention revealing the structure of the roller bearings which support the inner ring.

FIG. 5A is a fragmentary cross sectional view of portions of the electromagnetic machine of the present invention which include the primary coils.

Similar reference characters denote corresponding features consistently throughout the attached drawings, except for FIGS. 15 to 20A which are integral to the attached Appendix I and are solely referenced in the attached Appendix I.

DETAILED DESCRIPTION OF THE PREFERRED EMBODIMENTS

Figure 1A:
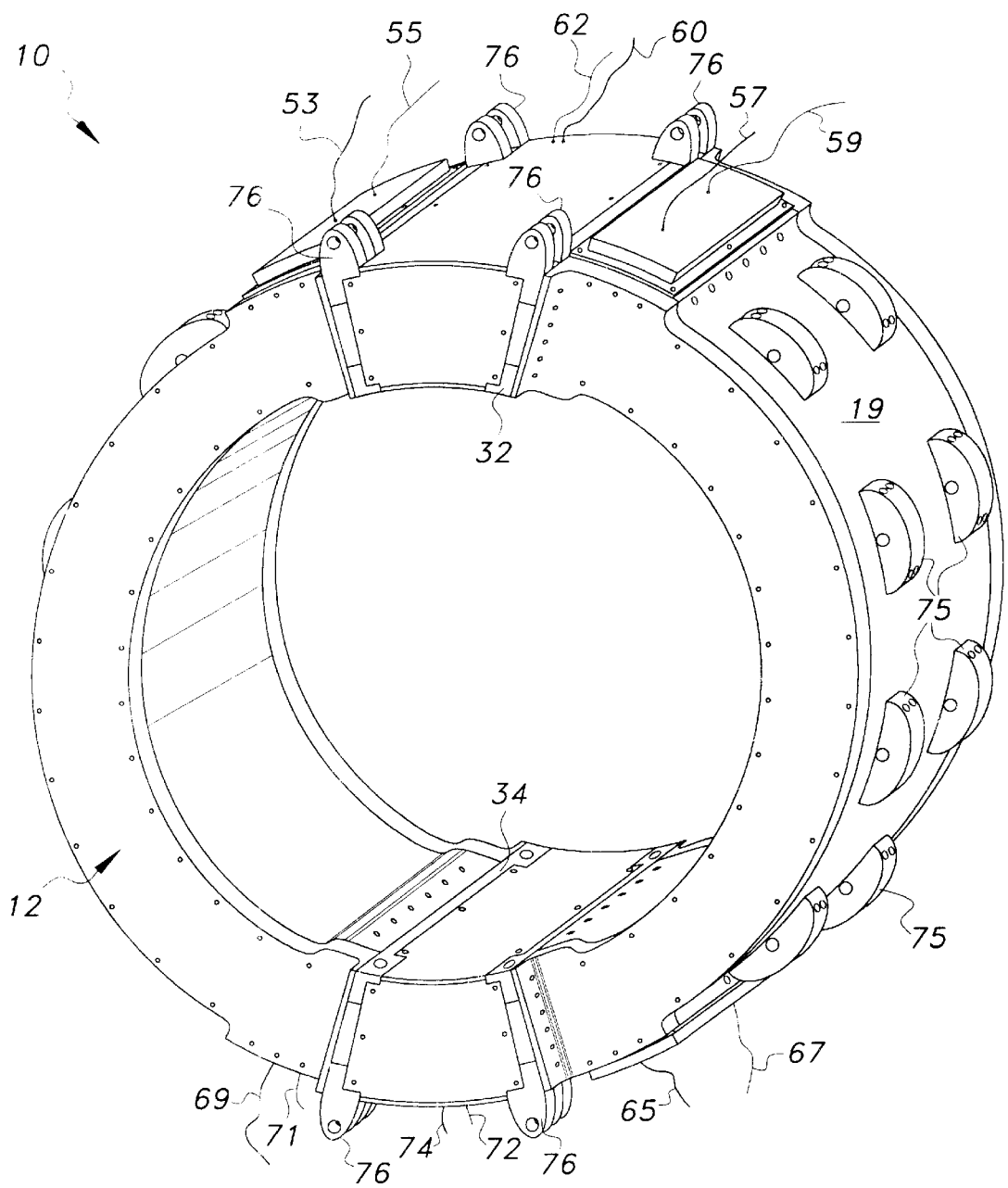
FIG. 1A is a perspective view of the electromagnetic machine of the present invention.
Figure 2:
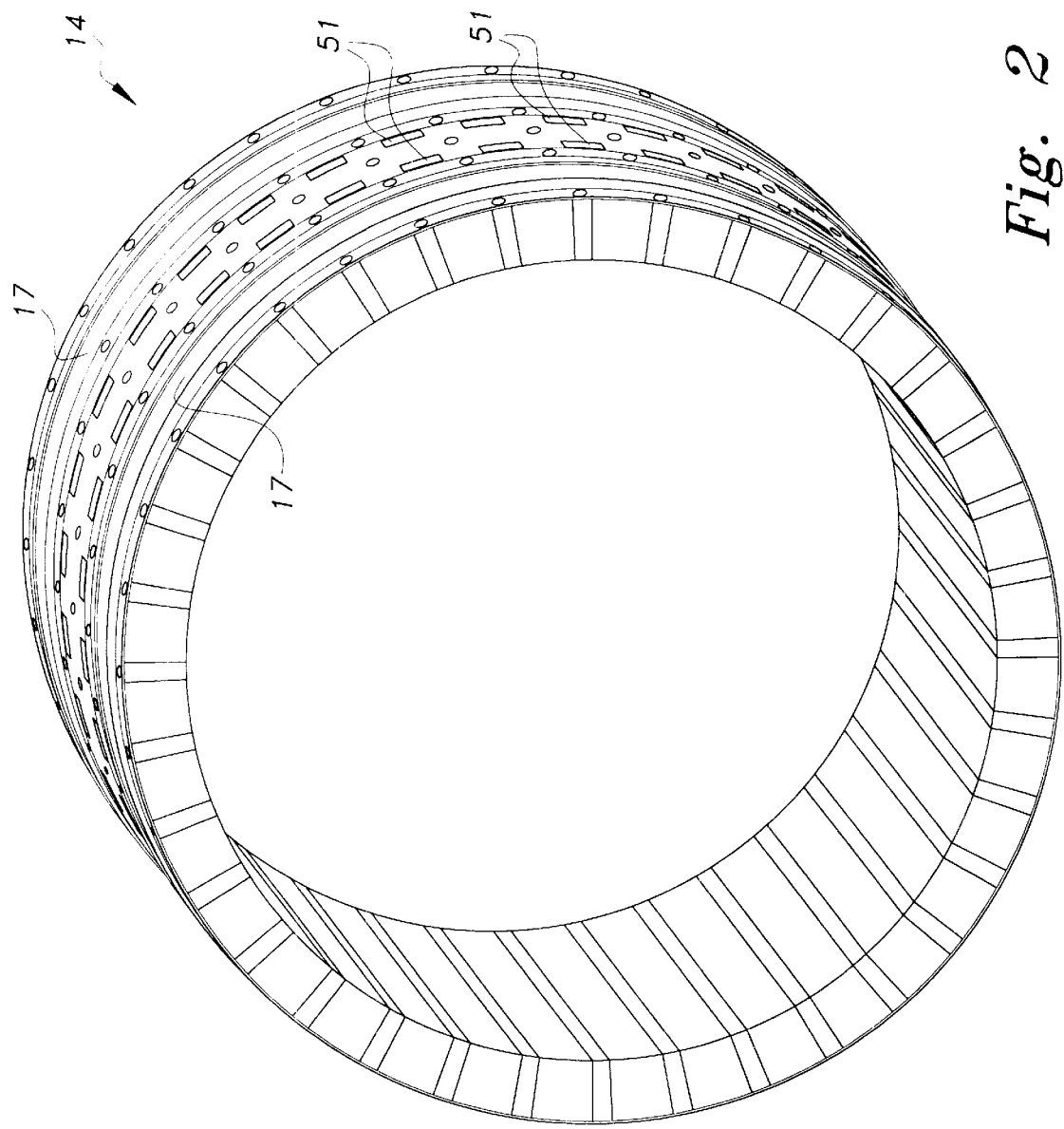
FIG. 2 is a perspective view of the inertia ring of the electromagnetic machine of the present invention.
Figure 3A:
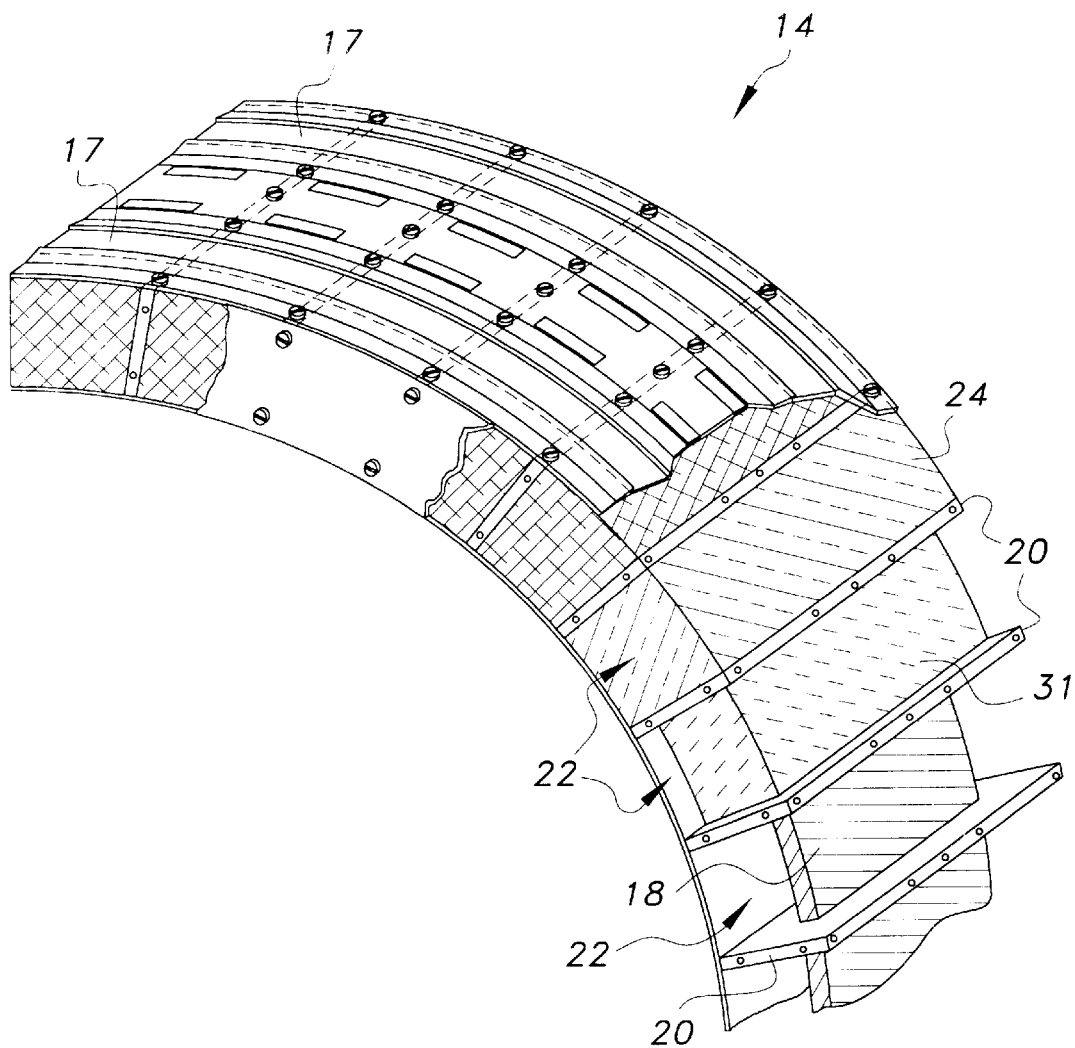
FIG. 3A is a fragmentary view of the inertia ring of the electromagnetic machine of the present invention.
Figure 3B:
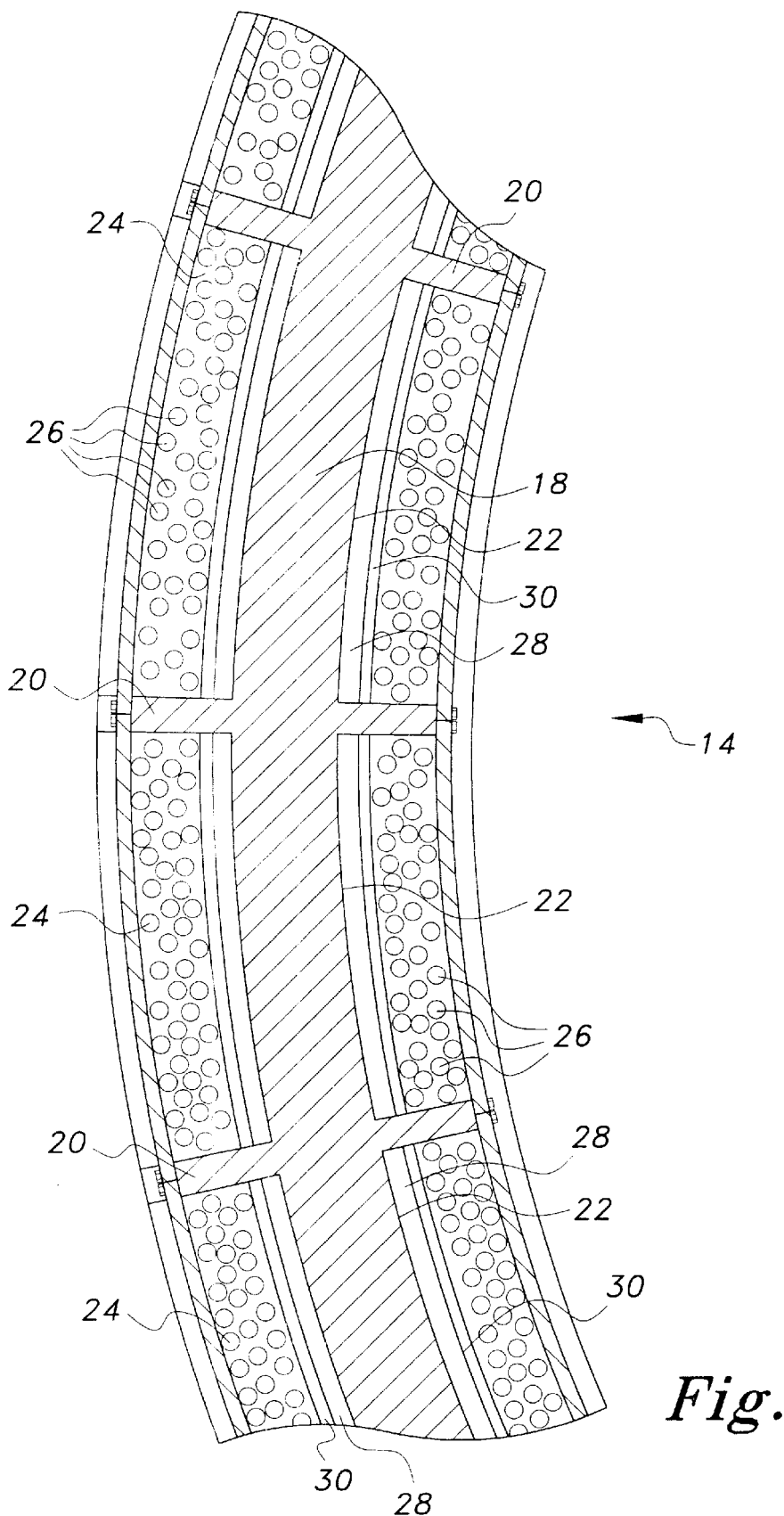
FIG. 3B is a fragmentary cross sectional view of the inertia ring of the electromagnetic machine of the present invention.
Figure 4:
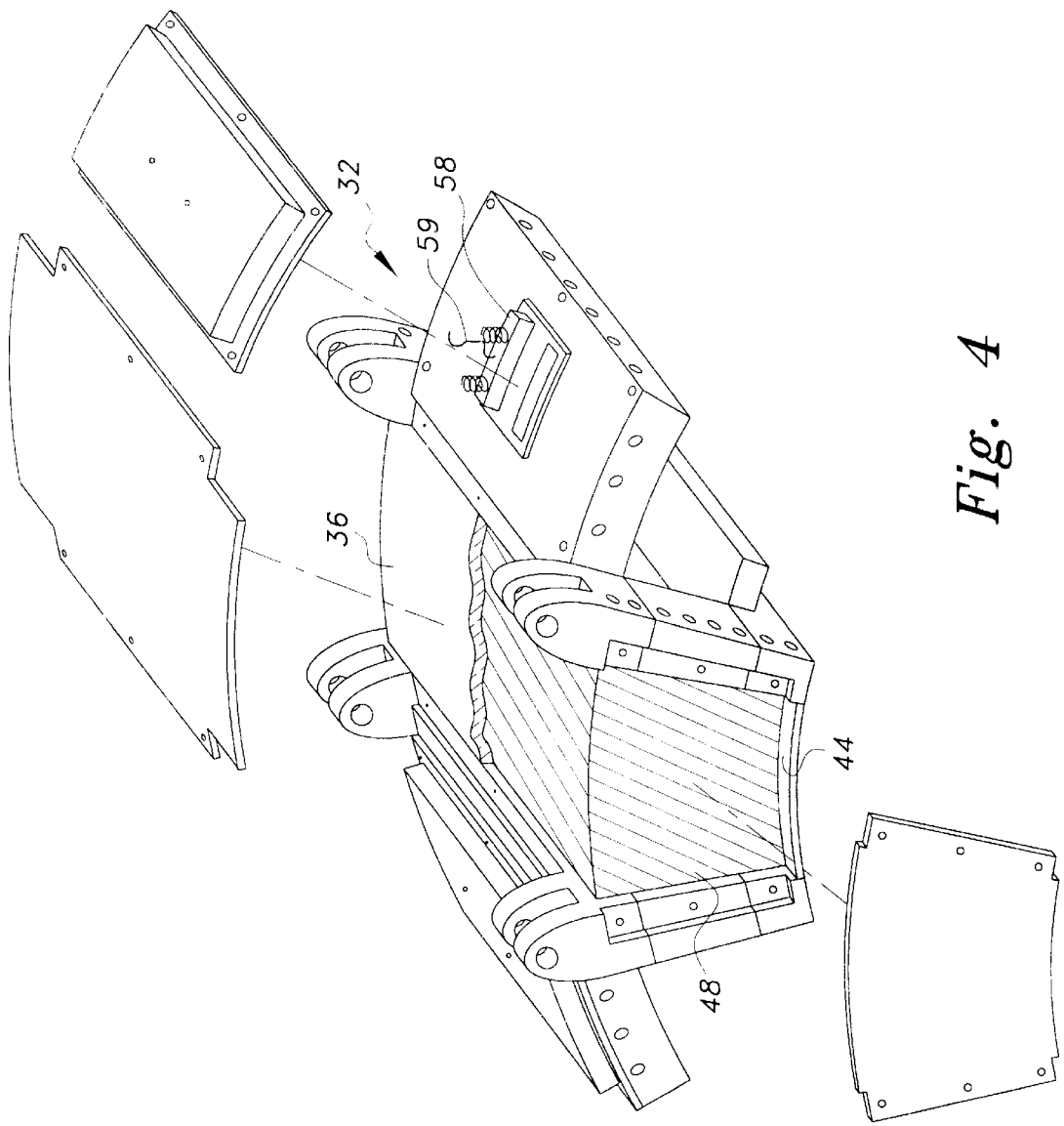
FIG. 4 is an exploded view of a section of the outer casing housing a primary coil of the electromagnetic machine of the present invention.

Referring to FIGS. 1A–6, the present invention is directed to an electromagnetic machine 10 for generating a propulsive force from electrical energy. The electromagnetic machine 10 includes an outer casing 12. The outer casing 12 is fabricated in sections that are fastened together by any well known means including nuts and bolts, screws, rivets, etc. The outer casing 12 is ring shaped and has a hollow interior, thus forming a toroidal or ring shaped enclosure. In the illustrated example the toroidal enclosure formed by the outer casing or housing 12 has a substantially rectangular cross section, however, the toroidal enclosure can have any desired cross section including circular, elliptical, or the shape of any other polygon.

An inertia ring 14 is disposed within the toroidal enclosure formed by the casing 12 and is substantially coextensive therewith. The inertia ring 14 is rotatably supported within the outer casing 12 by roller bearings 15 which are themselves rotatably supported at fixed locations within bearing housings 75 supported by the casing 12. The roller bearings 15 are preferably evenly distributed along the inside of the outer wall 19 of the outer casing 12. The roller bearings 15 extend at least in part into the bearing races 17 and contact the bearing races 17, such that as the inertia ring 14 rotates relative to the casing 12, the roller bearings 15 spin freely to thereby minimize friction between the inertia ring 14 and the outer casing 12. The bearings 15 should be sufficient in number such that the capacity of individual bearings for tolerating compressive forces, such as those due to the weight of the inertia ring 14 and/or the dynamics of the motion of the inertia ring 14 relative to the casing 12, will not be exceeded under all foreseeable circumstances. The inertia ring 14 is positioned within the outer casing 12 such that the inertia ring 14 is essentially concentric with the outer casing 12 as the inertia ring 14 rotates within the hollow interior of the outer casing 12.

Figure 5B:
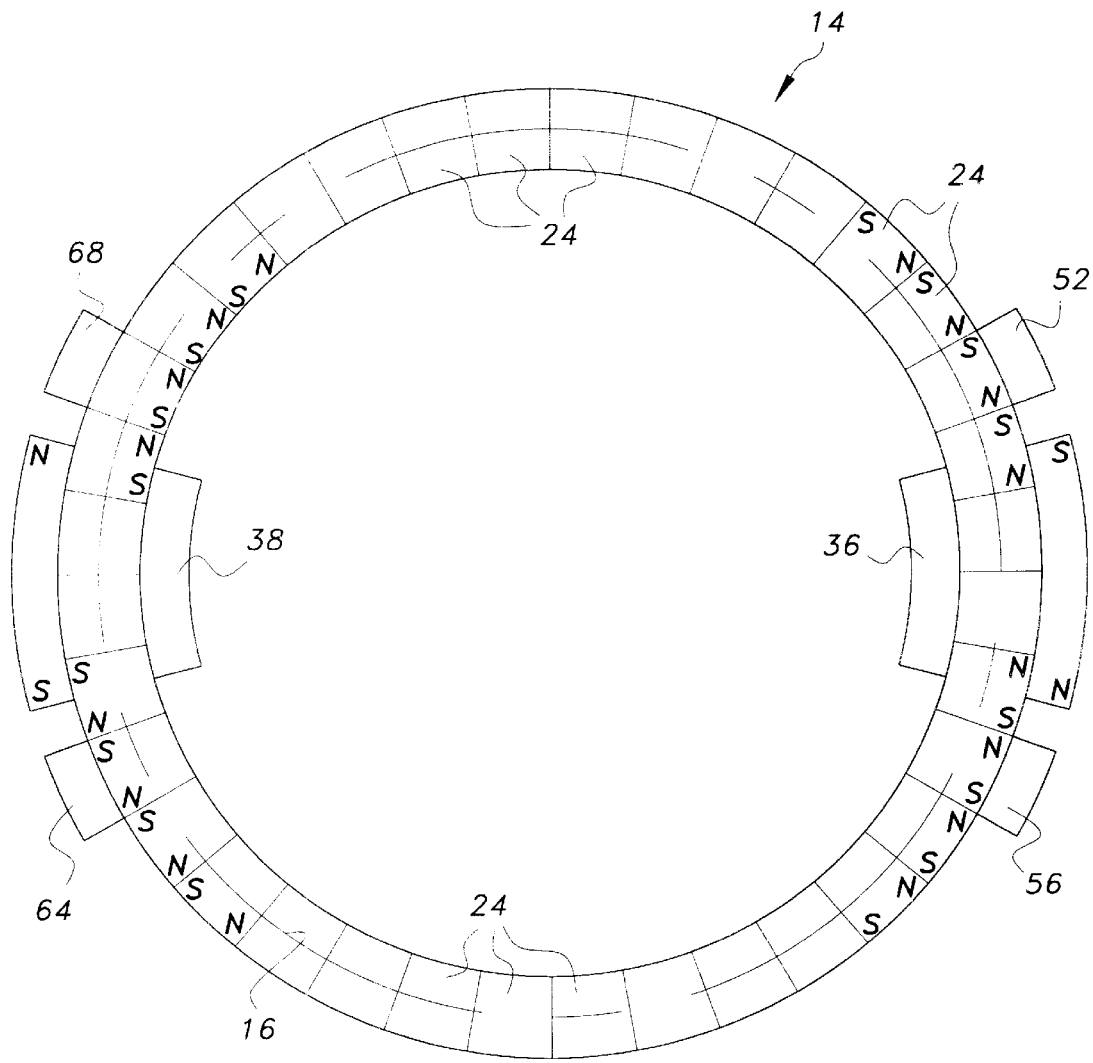
FIG. 5B is a schematic view showing the orientations of the magnetic dipoles in the various coils of the electromagnetic machine of the present invention during operation.

The inertia ring 14 has a circumferential axis 16 which passes through the cross section of the inertia ring 14 and is concentric with the inertia ring 14 (see FIG. 5B). The inertia ring 14 has a core 18 extending along the circumferential axis 16. The core 18 defines an enclosed perimeter.

The core 18 has a plurality of partitions 20 extending therefrom transversely to the circumferential axis 16. The partitions 20 are evenly spaced along the core 18 and form a plurality of regions 22. Each region 22 is separated from the two adjacent regions 22 on either side thereof by a respective pair of partitions 20. Each region 22 supports a respective one of a plurality of secondary coils 24. The plurality of secondary coils 24 are evenly spaced and are distributed circumferentially along the core 18. Each of the plurality of secondary coils 24 has a plurality of secondary coil windings 26 which surround the core 18 such that each of the plurality of secondary coil windings 26 passes through the enclosed perimeter defined by the core 18 while the core 18 passes through every one of the plurality of secondary coil windings 26. The secondary coils 24 are preferably made of insulated copper wiring.

The core 18 is made of a low magnetic permeability material or a paramagnetic hard metal, as are the partitions 20. Examples of low magnetic permeability material useful for the construction of the core 18 and the partitions 20 are electrical insulators, magnesium, magnesium alloys, chromium carbide, aluminum oxide, etc. In each region 22 the core 18 is covered with two layers of material 28 and 30, when a low magnetic permeability material is used for the core 18 and the partitions 20. The layers 28 and 30 are interposed between the core 18 and the plurality of secondary coil windings 26. The layers 28 and 30 are made of a high magnetic permeability material such as soft metals, iron and other ferrous metals, permalloy 45, supermalloy, and superconductive material. When the core 18 and the partitions 20 are made of a paramagnetic hard metal, a single layer of high magnetic permeability material 31 (see FIG. 3A) is interposed between the core 18 and the secondary coils 24.

Sections 32 and 34 of the outer casing 12 are specially designed to house first and second primary coils 36 and 38 respectively. Each of the primary coils 36 and 38 has a plurality of primary coil windings 40 and 42, respectively. The primary coils 36 and 38 are supported by the outer casing 12 such that each of the primary coils 36 and 38 surrounds an arc-shaped portion of the inertia ring 14, and each of the plurality of primary coil windings 40 and 42 passes through the enclosed perimeter defined by the inertia ring 14 while the inertia ring 14 passes through every one of the plurality of primary coil windings 40 and 42. The primary coils 36 and 38 are positioned on opposite sides of the outer casing 12 along a line coincident with a diameter of the outer casing 12.

The sections 32 and 34 of the outer casing 12 have compartments 44 which house the primary coils 36 and 38, respectively. The compartments 44 are shaped to essentially parallel the shape of the exterior surface of the inertia ring 14. If the primary coil windings 40 and 42 are not individually insulated, then the walls of the compartments 44 must be made of an insulating material so as to electrically isolate the primary coils 36 and 38 from each other and from the secondary coils 24. It is preferred to make the primary coil windings 40 and 42 from insulated copper wiring. A sleeve 48 made of one or more layers of high magnetic permeability material is interposed between each of the primary coils 36 and 38 and the walls, which are intermediate the primary coils and the inertia ring 14, of the compartments 44. The sleeves 48 can be made from any one or any combination of the materials listed as suitable for the fabrication of layers 28 and 30. Employing a multilayered structure for the sleeves 48 allows each layer of the sleeves 48 to be selected so as to taylor the physical properties of the sleeves 48 for a particular application. It would be a matter of routine experimentation to select the materials for the layers 28 and 30 and for the layers of the sleeves 48 to optimize the electromagnetic machine 10 for any given application.

Each of the secondary coils 24 has a pair of contact pads 51 associated therewith. Each of the secondary coils 24 has a pair of terminuses that are in electrical communication with a respective one of a respective pair of the contact pads 51 such that each of the secondary coils 24 can be energized when electrical current is supplied to its associated pair of contact pads 51.

A first pair of brushes 52 and 54 are supported by the outer casing 12 proximate the primary coil 36. During operation, the pair of brushes 52 and 54 are in electrical communication with a source of direct electrical current (also known as DC current) via conductors 53 and 55. One of the brushes 52 and 54 will be in contact with the positive terminal of the DC current source, while the other one of the brushes 52 and 54 is in contact with the negative terminal of the DC current source. The choice of polarity of the current supplied to brushes 52 and 54 is explained below. The pair of brushes 52 and 54 electrically energize a secondary coil 24 whenever the brushes 52 and 54 are in contact with the contact pads 51 associated with that particular secondary coil 24.

A second pair of brushes 56 and 58 are supported by the outer casing 12 proximate the primary coil 36 on the other side of the primary coil 36 relative to the brushes 52 and 54. During operation, the pair of brushes 56 and 58 are in electrical communication with a source of DC current via conductors 57 and 59. One of the brushes 56 and 58 will be in contact with the positive terminal of the DC current source, while the other one of the brushes 56 and 58 is in contact with the negative terminal of the DC current source. The choice of polarity of the current supplied to brushes 56 and 58 is explained below. The pair of brushes 56 and 58 electrically energize a secondary coil 24 whenever the brushes 56 and 58 are in contact with the contact pads 51 associated with that particular secondary coil 24.

Figure 6:
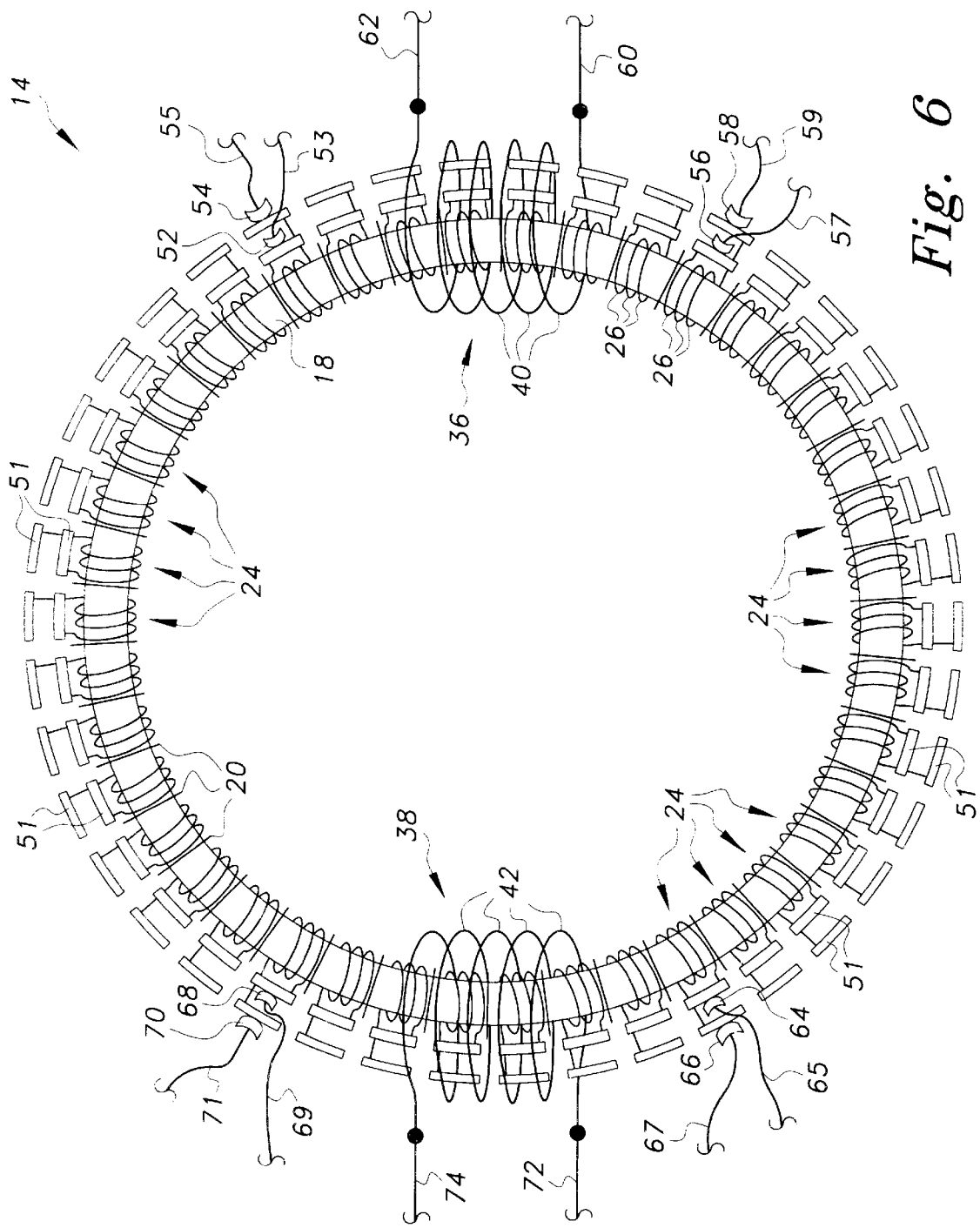
FIG. 6 is a schematic view showing the spacial relationships of the magnetic coils of the electromagnetic machine of the present invention.
Figure 7:
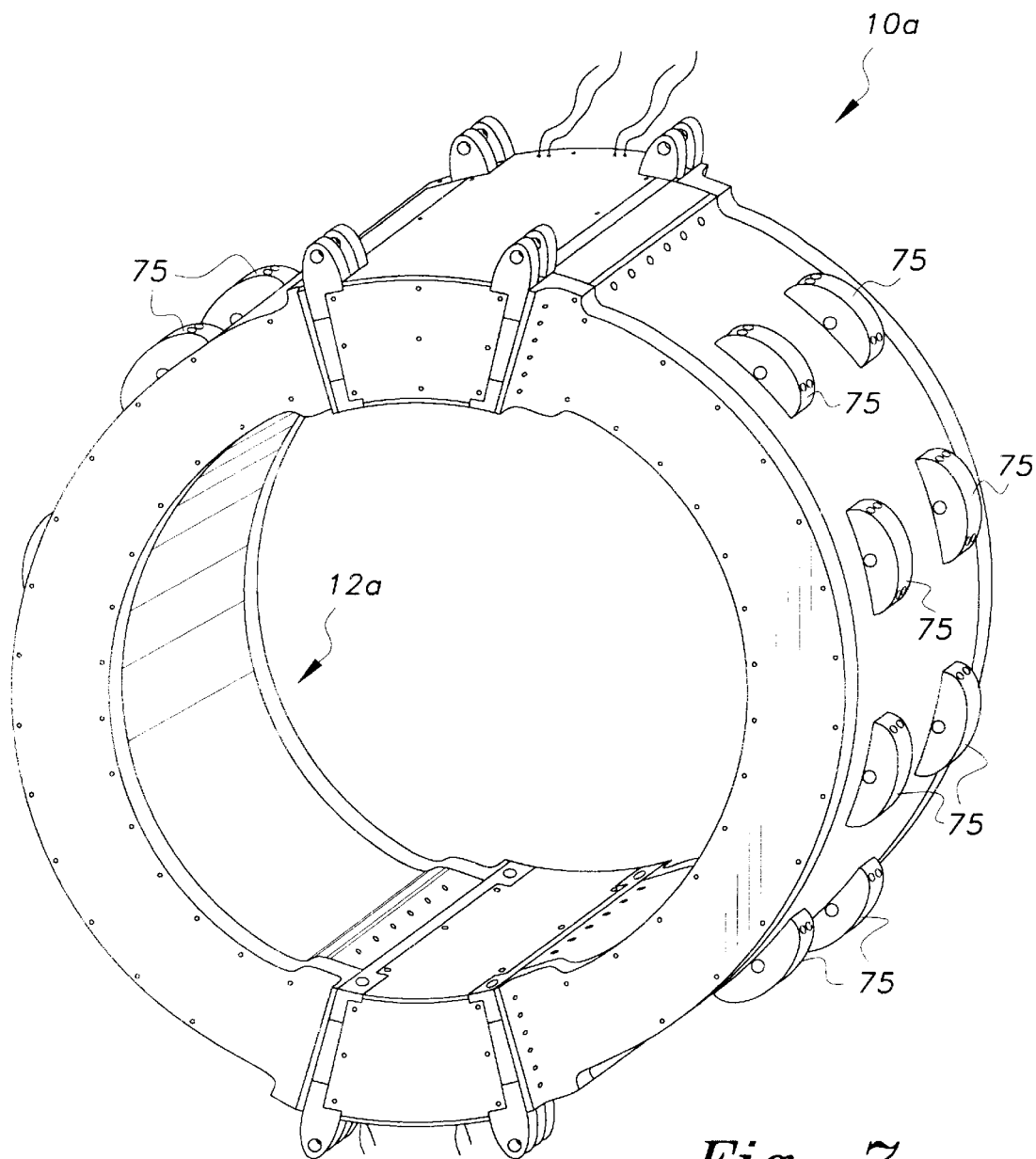
FIG. 7 is a perspective view of a second embodiment of the electromagnetic machine of the present invention.
Figure 8:
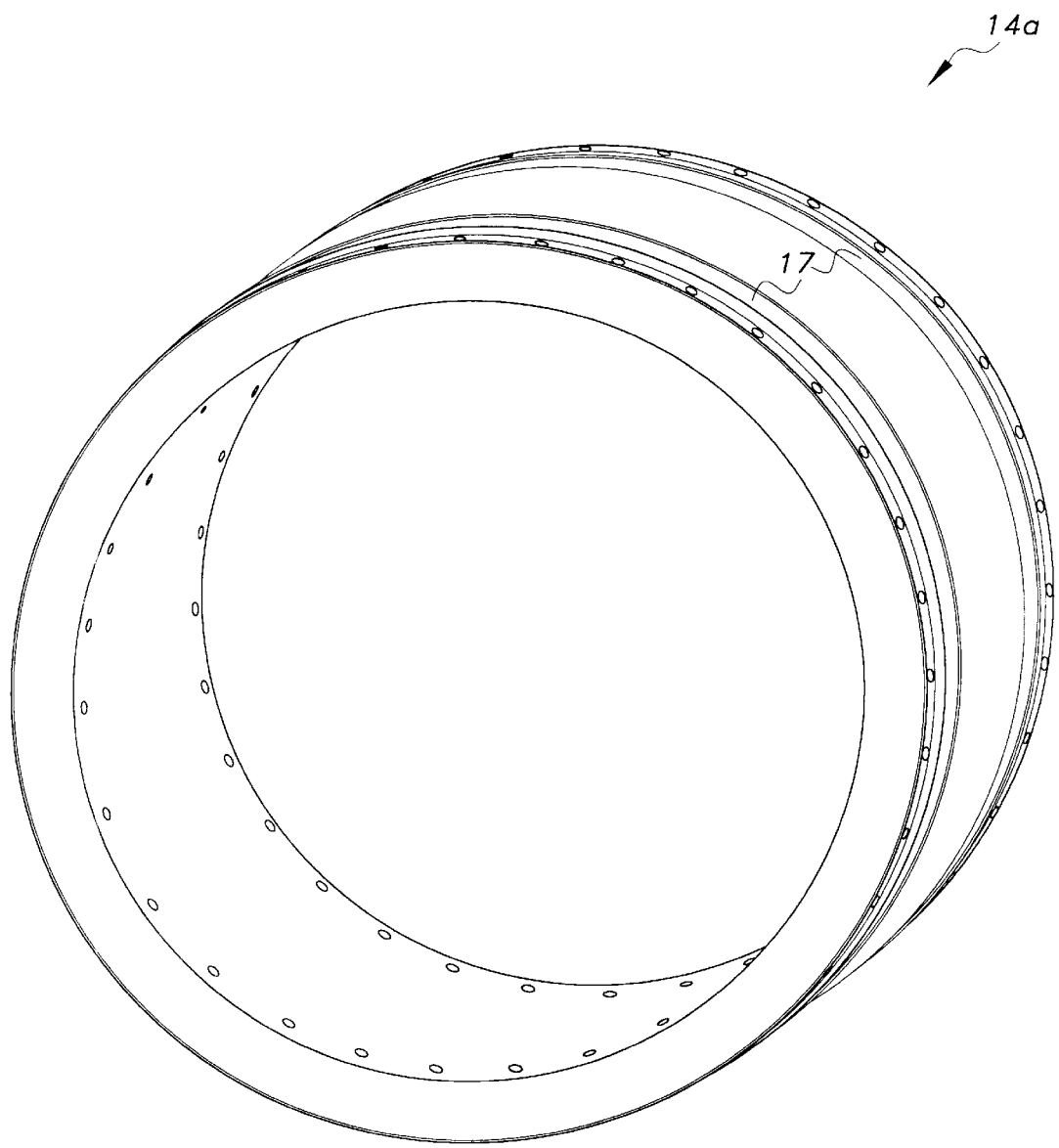
FIG. 8 is a perspective view of the inertia ring of the second embodiment of the electromagnetic machine of the present invention.
Figure 9:
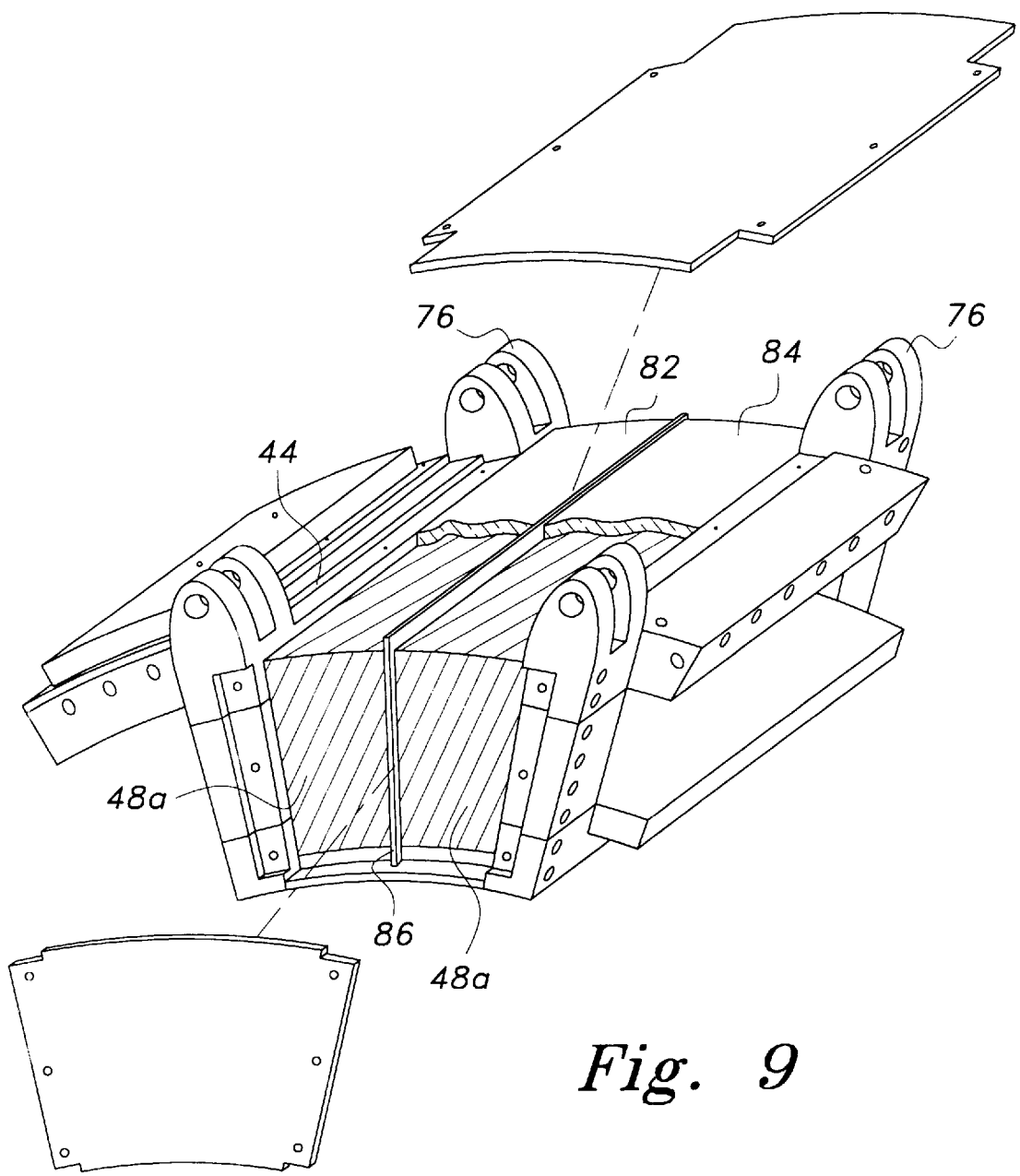
FIG. 9 is an exploded view of a section of the outer casing housing the primary coils of the second embodiment of the electromagnetic machine of the present invention.
Figure 10:
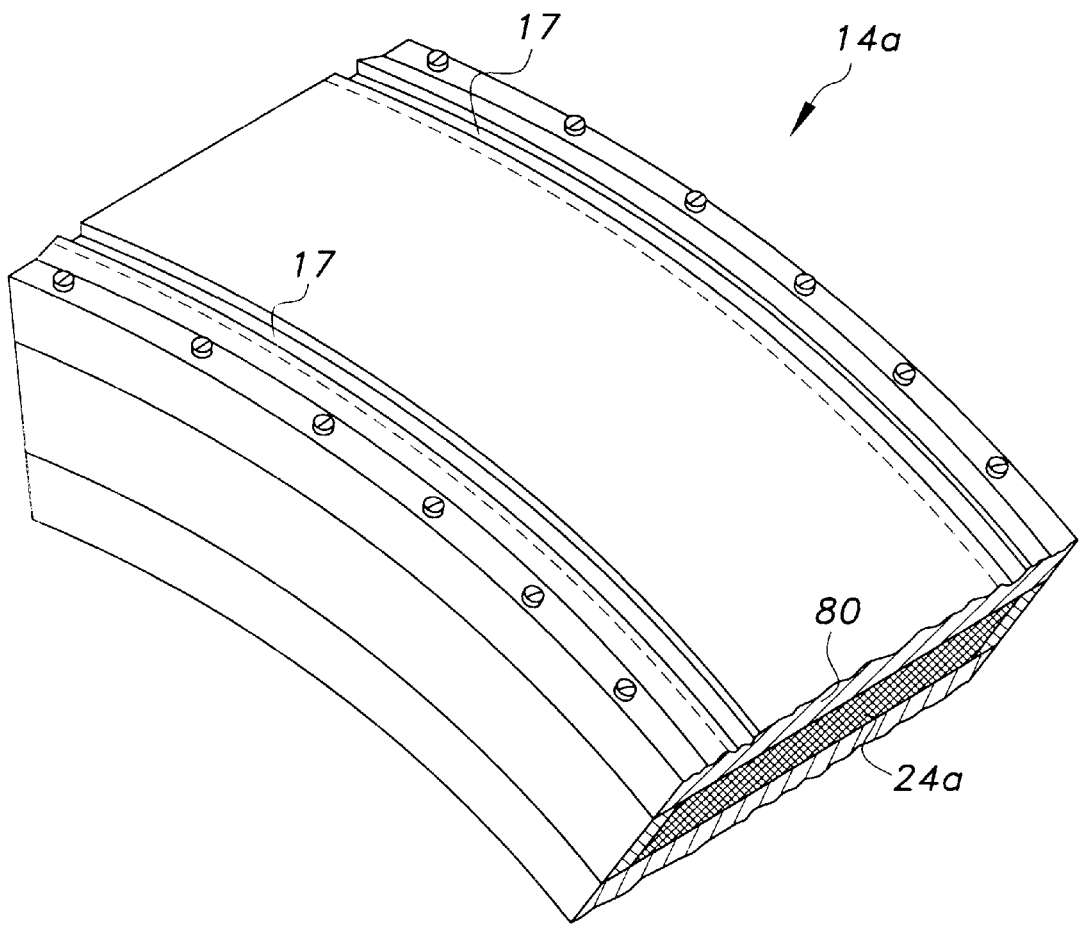
FIG. 10 is a fragmentary view of the inertia ring of the second embodiment of the electromagnetic machine of the present invention.
Figure 11:
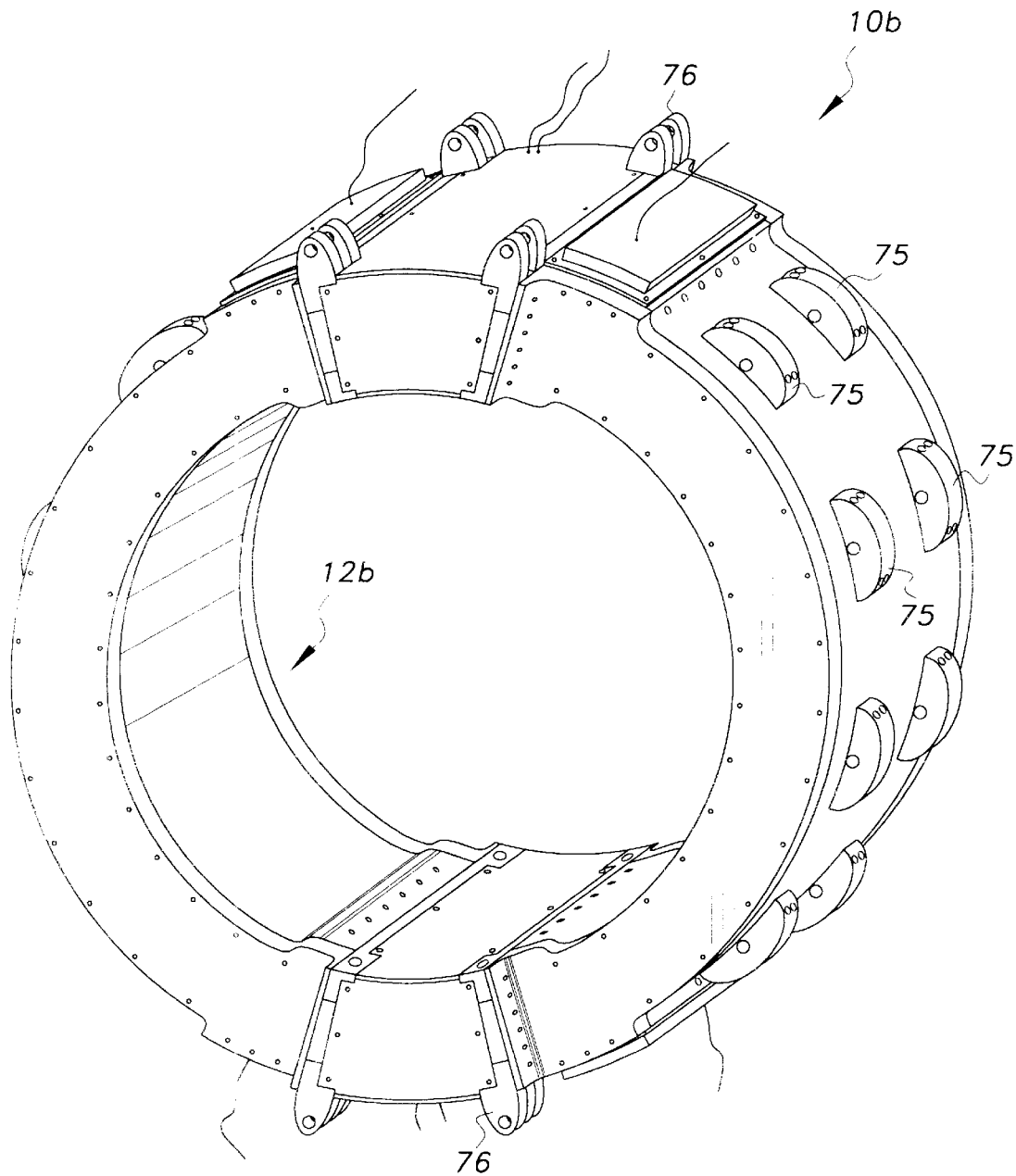
FIG. 11 is a perspective view of a third embodiment of the electromagnetic machine of the present invention.

Referring to FIGS. 5A, 5B, and 6, consider the clockwise rotation of the inertia ring 14. As the inertia ring 14 rotates in a clockwise direction, each of the plurality of secondary coils 24 sequentially passes the first pair of brushes 52 and 54, the primary coil 36, and the second pair of brushes 56 and 58. As is well known from the science of electromagnetism whenever a DC current is supplied to a coil of wire, a magnetic dipole having a north pole (N) and a south pole (S) is created. Now assume a DC current is being supplied to the primary coil 36 such that its north and south poles are oriented as shown in FIG. 5B. Also assume a DC current is being supplied to brushes 52 and 54 with a polarity such that each of the secondary coils 24, after coming into contact with brushes 52 and 54, acquires a magnetic dipole oriented such that the north pole of the coil 24 is closest to the south pole of the primary coil 36, as shown in FIG. 5B. Further, a DC current is supplied to brushes 56 and 58 with a polarity such that each of the secondary coils 24, after coming into contact with brushes 56 and 58, acquires a magnetic dipole oriented such that the north pole of the coil 24 is closest to the north pole of the primary coil 36, again as shown in FIG. 5B.

As the inertia ring 14 rotates in the clockwise direction, each of the plurality of secondary coils 24 comes into contact with the brushes 52 and 54 through its associated contact pads 51. At this position, each secondary coil 24 is energized and acquires a magnetic dipole oriented such that an attractive force is created between the secondary coil 24 and the primary coil 36. As each secondary coil 24 loses contact with brushes 52 and 54, it continues to retain a residual magnetic dipole of the same orientation due to the magnetic dipole moment induced in the high permeability layers 28 and 30. Thus as each secondary coil 24 loses contact with the brushes 52 and 54 the secondary coil 24 continues to experience an attractive force pulling the secondary coil towards the primary coil 36. As each of the plurality of secondary coils 24 comes into contact with the brushes 56 and 58, through its associated contact pads 51, each secondary coil 24 is again energized and acquires a magnetic dipole oriented such that a repulsive force is created between the secondary coil 24 and the primary coil 36. As each secondary coil 24 loses contact with brushes 56 and 58, it continues to retain a residual magnetic dipole of the same orientation, again, due to the magnetic dipole moment induced in the high permeability layers 28 and 30. Thus as each secondary coil 24 loses contact with the brushes 56 and 58 the secondary coil 24 continues to experience a repulsive force pushing the secondary coil away from the primary coil 36.

Thus, as the inertia ring 14 rotates in the clockwise direction, the first pair of brushes 52 and 54 electrically energize each of the plurality of secondary coils 24 in sequence as each of the plurality of secondary coils 24 passes the first pair of brushes 52 and 54, and the first pair of brushes 52 and 54 energize each of the plurality of secondary coils 24 with a first polarity which causes the secondary coils 24 to be attracted toward the primary coil 36. Also, as the inertia ring 14 rotates in the clockwise direction, the second pair of brushes 56 and 58 electrically energize each of the plurality of secondary coils 24 in sequence as each of the plurality of secondary coils 24 passes the second pair of brushes 56 and 58, and the second pair of brushes 56 and 58 energize each of the plurality of secondary coils 24 with a second polarity which is opposite to the first polarity and causes each of the secondary coils 24 to be repelled by the primary coil 36.

Also each secondary coil 24 has a tendency to induce a similarly oriented magnetic dipole in the layers 28 and 30 of its adjacent secondary coils. Thus as seen in FIG. 5B, the secondary coils 24 positioned generally in the upper right quadrant of the outer casing 12 are pulled toward the primary coil 36, while the secondary coils 24 positioned generally in the lower right quadrant of the outer casing 12 are pushed away from the primary coil 36. Thus, the primary coil 36 exerts forces on the inertia ring 14 which maintain the inertia ring 14 in rotation and/or rotationally accelerate (i.e. increase the rotational speed of) the inertia ring 14.

A pair of terminals or conductors 60 and 62 electrically connect to the primary coil 36 to thereby allow the primary coil 36 to be electrically energized by a suitable power source. In the example illustrated in FIG. 5B, current is supplied to the primary coil 36 such that the magnetic dipole formed in the primary coil 36 has the same first polarity or dipole orientation as the secondary coils 24 generally located in the upper right quadrant of the outer casing 12 so that the secondary coils 24 located within the upper right quadrant of the outer casing 12 are attracted to the primary coil 36.

It should readily be apparent to those skilled in the art that a single primary coil is sufficient to cause the rotation of the inertia ring 14. However, if greater rotational acceleration and/or torque is required, then the primary coil 38 may also be used to impart additional torque to the inertia ring 14. As with the primary coil 36, a pair of brushes 64 and 66 are supported by the outer casing 12 near one side of the primary coil 38. Another pair of brushes 68 and 70 are supported by the outer casing 12 near the other side of the primary coil 38. Referring to FIGS. 5B and 6, as the inertia ring 14 rotates in a clockwise direction, each of the plurality of secondary coils 24 sequentially passes the first pair of brushes 64 and 66, the primary coil 38, and the second pair of brushes 68 and 70. The pair of brushes 64 and 66 are in electrical communication, via conductors 65 and 67, with a source of DC current and energize each of the secondary coils 24 as each secondary coil 24 passes the location of the brushes 64 and 66. The current supplied by brushes 64 and 66 generate magnetic dipoles in the secondary coils 24. Preferably, the dipoles generated in secondary coils 24, by brushes 64 and 66, will have the same orientation, e.g. south pole leading the north pole, as the dipoles generated by brushes 56 and 58. The primary coil 38 is energized by a direct current source such that a magnetic dipole is generated therein which attracts the dipoles generated by the brushes 64 and 66 in the secondary coils 24.

The pair of brushes 68 and 70 are also in electrical communication, via conductors 69 and 71, with a source of DC current and energize each of the secondary coils 24 as each secondary coil 24 passes the location of the brushes 68 and 70. The current supplied by brushes 68 and 70 generates magnetic dipoles in the secondary coils 24. The dipoles generated in secondary coils 24, by brushes 68 and 70, will have an orientation opposite the orientation of the dipoles generated by brushes 64 and 66. The dipoles generated by brushes 68 and 70 will be repelled by the primary coil 38. As with brushes 52, 54, 56, and 58, the brushes 64, 66, 68, and 70 energize the secondary coils 24 through the contact pads 51.

Again, each secondary coil 24 has a tendency to induce a similarly oriented magnetic dipole in the layers 28 and 30 of its adjacent secondary coils. Thus as seen in FIG. 5B, the secondary coils 24 positioned generally in the lower left quadrant of the outer casing 12 are pulled toward the primary coil 38, while the secondary coils 24 positioned generally in the upper left quadrant of the outer casing 12 are pushed away from the primary coil 38. Thus, the primary coil 38 exerts forces which impart a torque on the inertia ring 14 which causes rotation of the inertia ring 14 in the clockwise direction. A pair of terminals or conductors 72 and 74 electrically connect to the primary coil 38 to thereby allow the primary coil 38 to be electrically energized by a suitable power source. The two primary coils 36 and 38 working together allow faster rotational accelerations and rotational speeds to be achieved by the inertia ring 14.

It should be readily apparent to anyone skilled in the art that short-circuits should be avoided if the electromagnetic machine 10 is to work properly. Therefore, it should be readily apparent that the brushes 52, 54, 56, 58, 64, 66, 68, and 70 are electrically insulated from the casing 12 and from each other, and that the only structures that these brushes conductively contact are the wires that supply them and the contact pads 51. Referring to FIG. 1B, insulating shields 61 such as those surrounding the brushes 52 and 54 insulate all the brushes 52, 54, 56, 58, 64, 66, 68, and 70 from the outer casing 12. Similarly, the contact pads 51 must be insulated from the inertia ring 14 and from each other, conductively contacting only a respective terminal of their respective secondary coil 24 and the brushes 52, 54, 56, 58, 64, 66, 68, and 70.

An example of the application of the electromagnetic machine 10 would be for the propulsion of a wheeled ground vehicle. The forces exerted by the primary coils 36 and 38 on the inertia ring 14 cause reaction forces on the outer casing 12 which tend to rotate the outer casing 12 in a direction opposite to the direction of rotation of the inertia ring 14. Thus by fixing the outer casing 12 concentrically to a wheel, using the bolt holes in bosses 76, the wheel can be powered to rotate.

The electromagnetic machine 10 is a prime mover of general applicability and can be used for a variety of applications by varying the size and controlling the application of currents to the primary coils 36 and 38 and brushes 52, 54, 56, 58, 64, 66, 68, and 70.

Rather than continuous rotational motion, oscillatory movement can also be obtained from the electromagnetic machine 10. To explain how oscillatory movement is obtained from the electromagnetic machine 10, reference is once again made to FIG. 5B. Here, current is supplied to the primary coil 36, and to the brushes 52, 54, 56, and 58 as before to rotate the inertia ring 14 in the clockwise direction. No current is supplied to the primary coil 38 and the brushes 64, 66, 68, and 70 at this time. After a time equal to half the period of the desired oscillatory motion, current supply to the primary coil 36, and to the brushes 52, 54, 56, and 58 are interrupted and current is supplied to the primary coil 38 and the brushes 64, 66, 68, and 70. If the current to the brushes 64, 66, 68, and 70 is supplied in exactly the same manner as was described for the case of continuous motion, then the polarity of the current supplied to the primary coil 38 is reversed compared to the polarity of the current for the continuous motion case such that the primary coil 38 will repel the secondary coils 24 in the lower left quadrant and attract the secondary coils 24 in the upper left quadrant. The reaction forces on the outer casing 12 will now tend to rotate the outer casing 12 in a direction opposite to that which was caused by the initial energizing of the primary coil 36. At a time equal to one period of the oscillation, current supply to the primary coil 38 and the brushes 64, 66, 68, and 70 are interrupted and current is supplied to the primary coil 36, and to the brushes 52, 54, 56, and 58 in the same manner as before to repeat the process. Thus oscillatory movement of the outer casing 12 is obtained. This oscillatory movement can be harnessed for any desirable purpose. For example the oscillating electromagnetic machine 10 can impart oscillatory movement to a vibratory type pile driver.

It is within the level of ordinary skill in the art to design the power supply and control circuitry to supply current to the primary coils 36 and 38 and to the brushes 52, 54, 56, 58, 64, 66, 68, and 70, in any of the various ways described herein.

A further application contemplated for the electromagnetic machine 10 of the present invention is the launching of payloads into outer space. To use electromagnetic machine 10 for generation of thrust, the inertia ring is first spun up to speed as described for the case of continuous rotation and then the currents to the primary coils 36 and 38, and to the brushes 52, 54, 56, 58, 64, 66, 68, and 70, are controlled to alternatingly accelerate and decelerate the inertia ring 14. The interaction of the energy stored in inertia ring 14 and the reaction forces on the primary coils 36 and 38 will cause a propulsive thrust to be generated by the electromagnetic machine 10.

With reference to FIG. 6, it should be borne in mind that the depiction of contact pads 51 is only diagrammatic and the particular depiction in FIG. 6 is intended to convey, in a simple two dimensional drawing, the fact that the pads 51 are spaced apart in a direction perpendicular to the drawing page. The true spacial arrangement of the pads 51 can be seen in FIG. 2.

Referring to FIGS. 7–10, the second embodiment of the electromagnetic machine 10a can be seen. The electromagnetic machine 10a is generally similar to the electromagnetic machine 10 except for the differences enumerated below. The electromagnetic machine 10a includes an outer casing 12a and an inertia ring 14a. The inertia ring 14a uses a ring shaped, hard metal, permanent magnet 24a known as a Rowland ring. Therefore, the inertia ring 14a does not require a supply of electrical energy as is the case with the inertia ring 14. The use of a permanent magnet obviates the need for contact pads 51 and brushes 52, 54, 56, 58, 64, 66, 68, and 70. The outer casing 12a differs from the casing 12 in that the housings for the brushes 52, 54, 56, 58, 64, 66, 68, and 70 have been eliminated from the casing 12a. The inertia ring 14a also includes a casing 80 which encases the magnet 24a. The casing 80 is fabricated in sections that can be fastened together by any well known means including nuts and bolts, screws, rivets, etc. The casing 80 is made of a paramagnetic hard metal and has the roller bearing tracks 17 formed in the casings outermost surface.

The electromagnetic machine 10a also differs from the electromagnetic machine 10 in that the electromagnetic machine 10a has a different primary coil system. In the electromagnetic machine 10a each of primary coils 36 and 38 is replaced by an adjacent pair of primary coils 82 and 84 which are separated by a divider 86. Each of the primary coils 82 and 84 is wrapped over a sleeve 48a of high magnetic permeability material. The separate coils 82 and 84 allow the polarities of the coils 82 and 84 to be independently controlled to better taylor the operation of the primary coils 82 and 84 to the requirements of the permanent magnet type inertia ring 14a.

Figure 12:
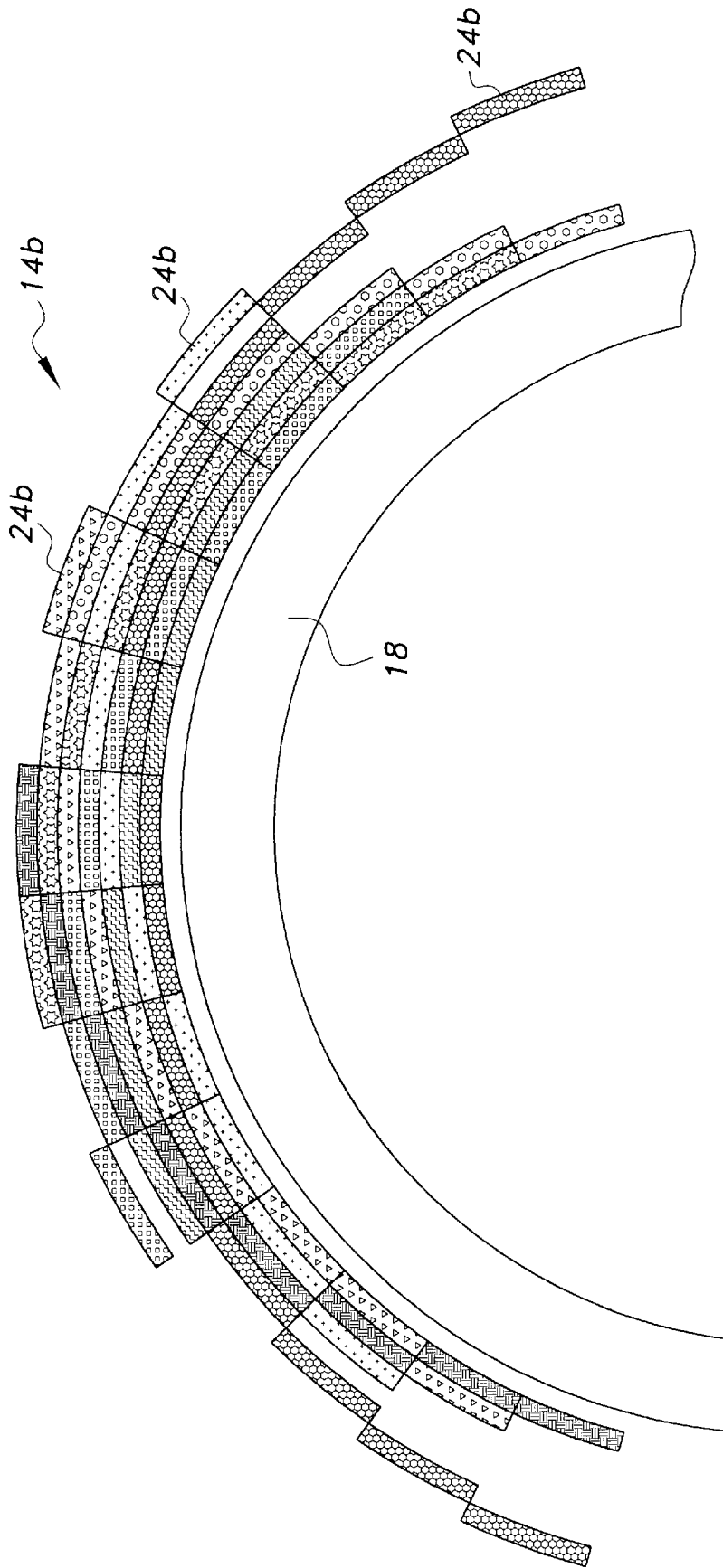
FIG. 12 is a diagrammatic view of the stepped arrangement of the secondary coils of the third embodiment of the electromagnetic machine of the present invention.
Figure 13:
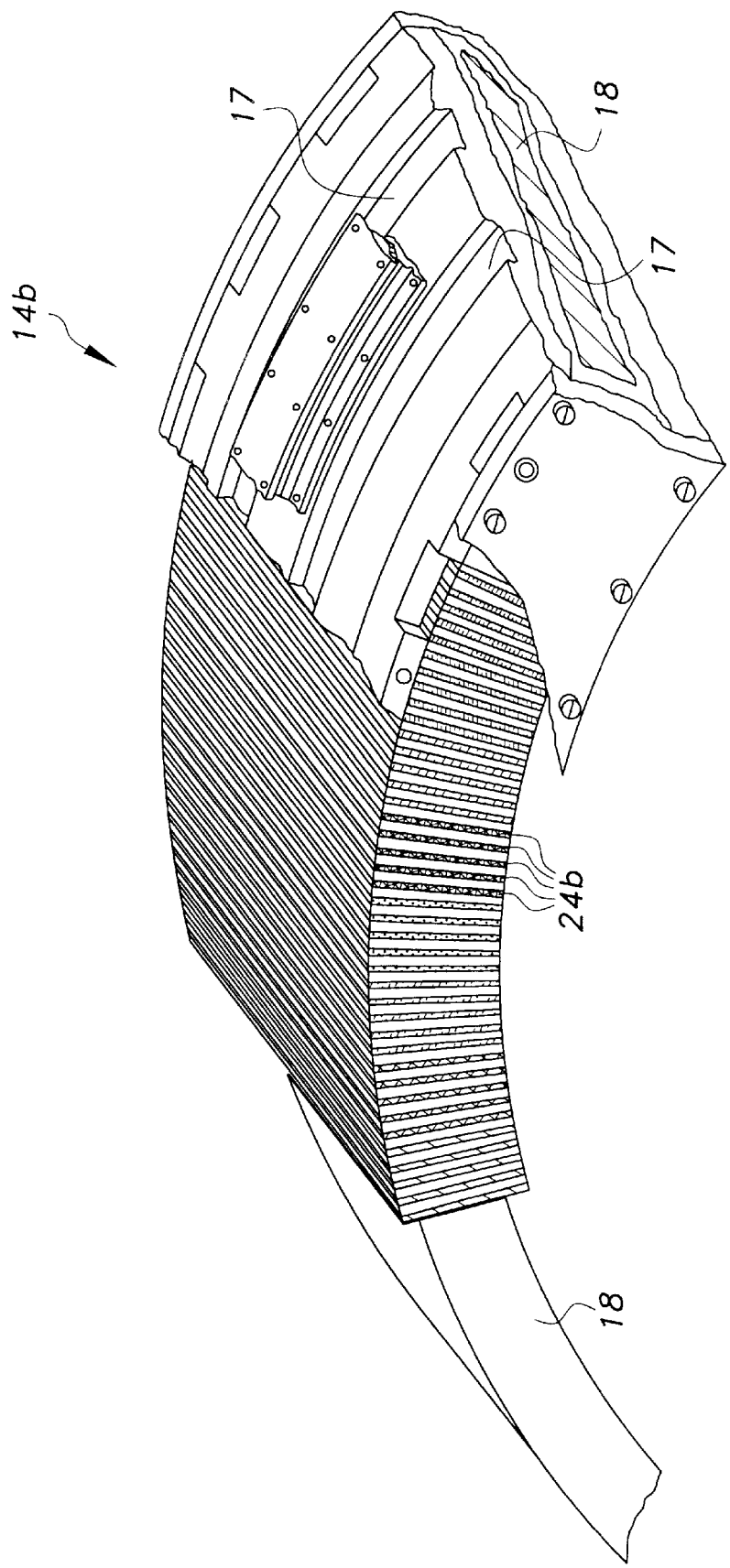
FIG. 13 is a fragmentary view of the inertia ring of the third embodiment of the electromagnetic machine of the present invention.
Figure 14:
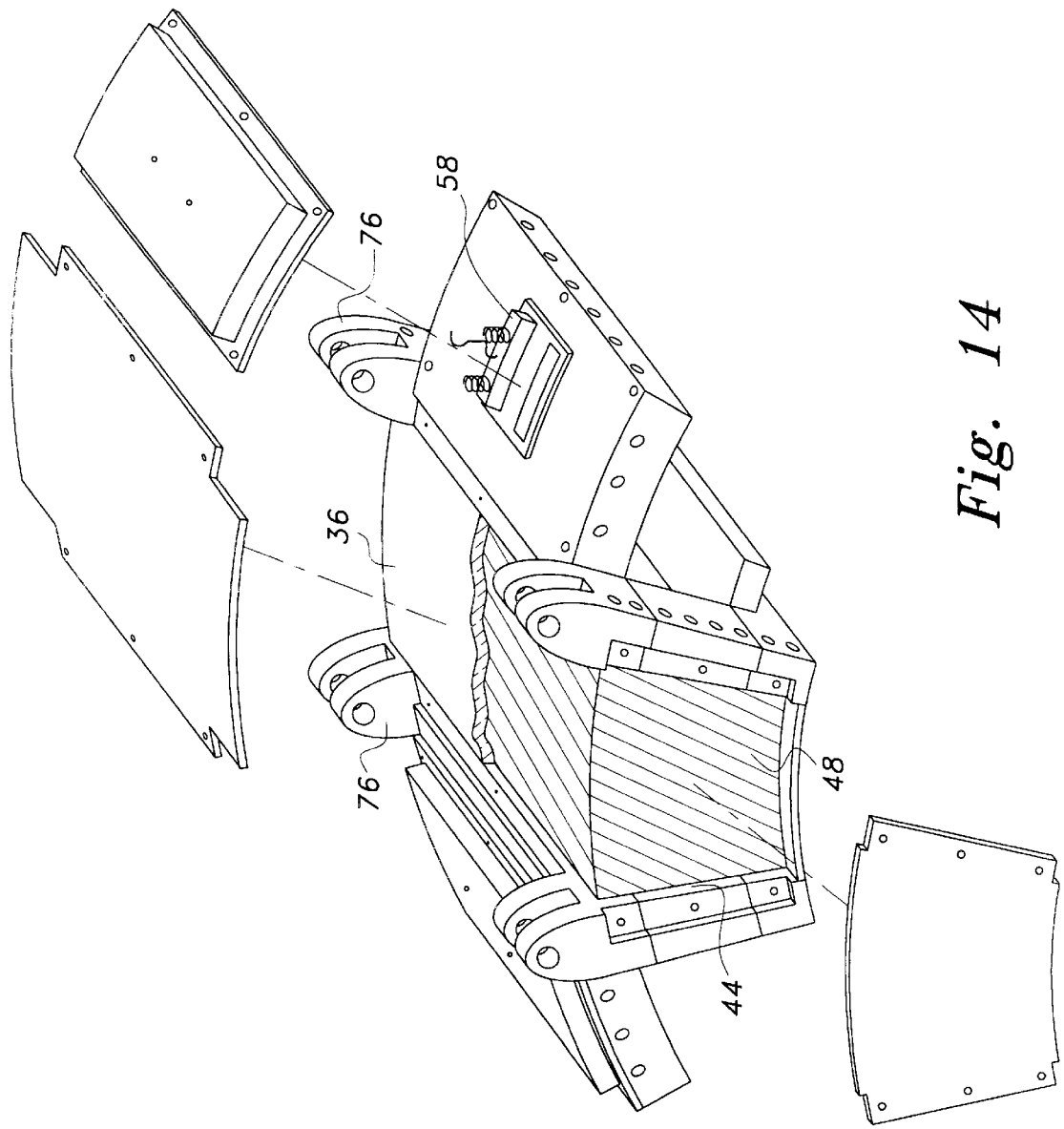
FIG. 14 is an exploded view of a section of the outer casing housing a primary coil of the third embodiment of the electromagnetic machine of the present invention.
Figure 15:
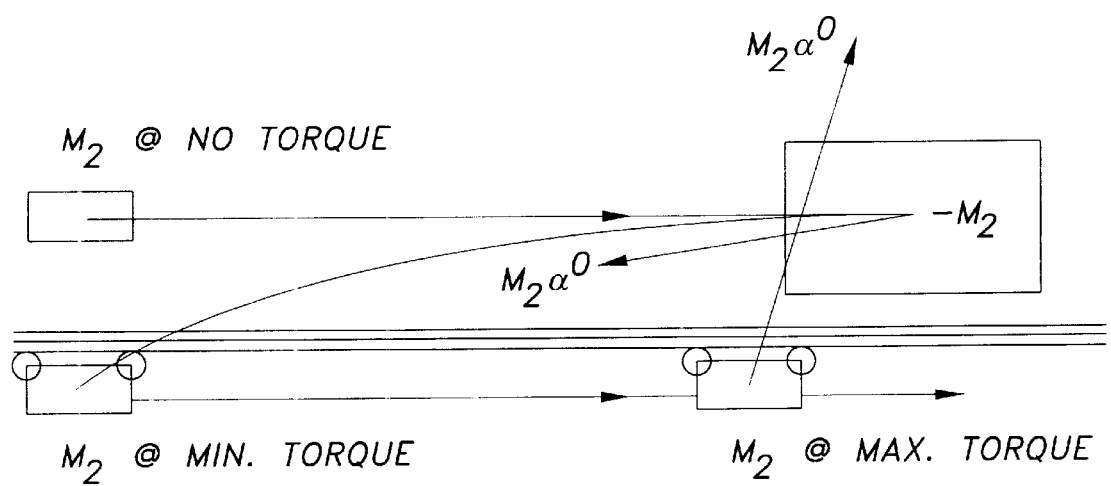
FIG. 15 is a diagrammatic view used in the calculation of the forces on elements of the electromagnetic machine of the present invention.
Figure 16:
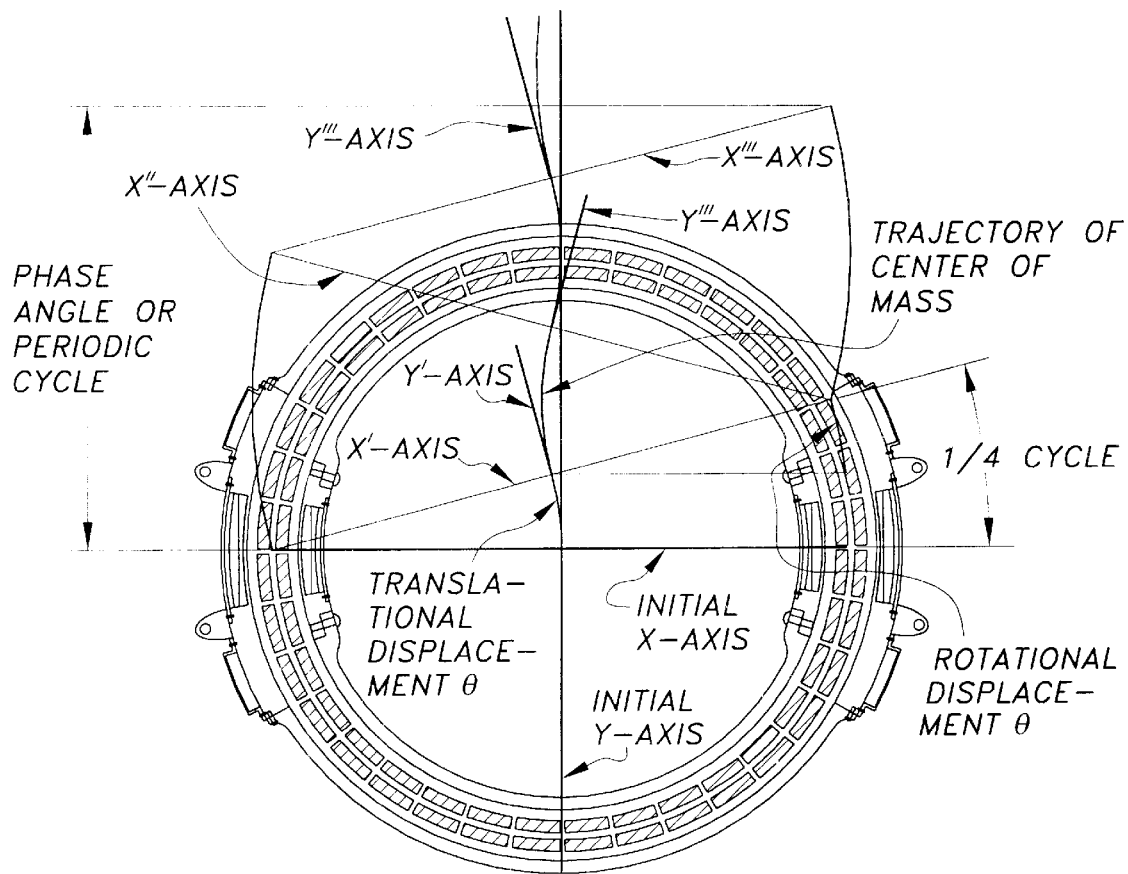
FIG. 16 is a diagrammatic view used in the calculation of the motion of the electromagnetic machine of the present invention.
Figure 17:
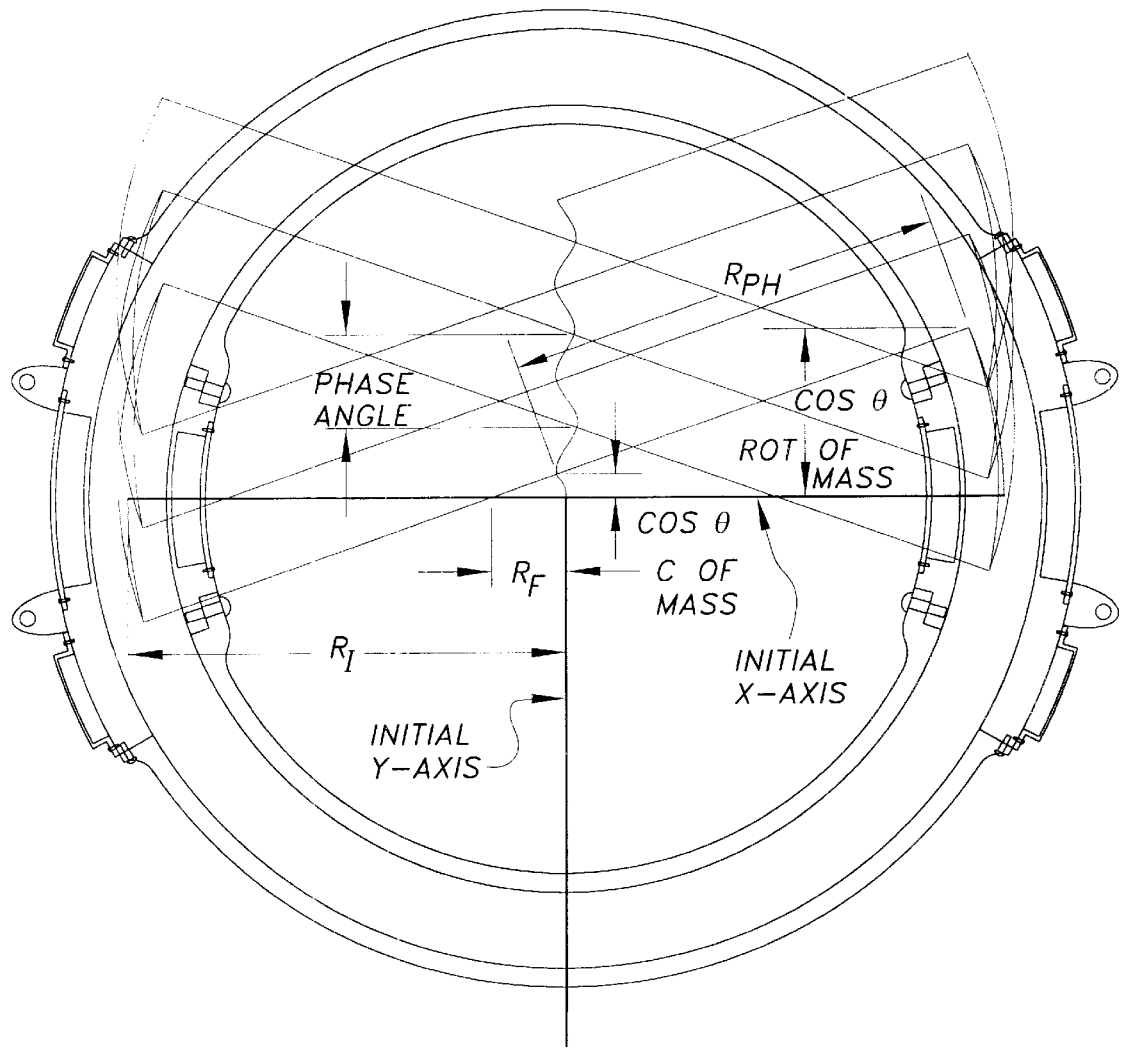
FIG. 17 is a diagrammatic view depicting some of the variables used in the calculation of the motion of the electromagnetic machine of the present invention.
Figure 18:
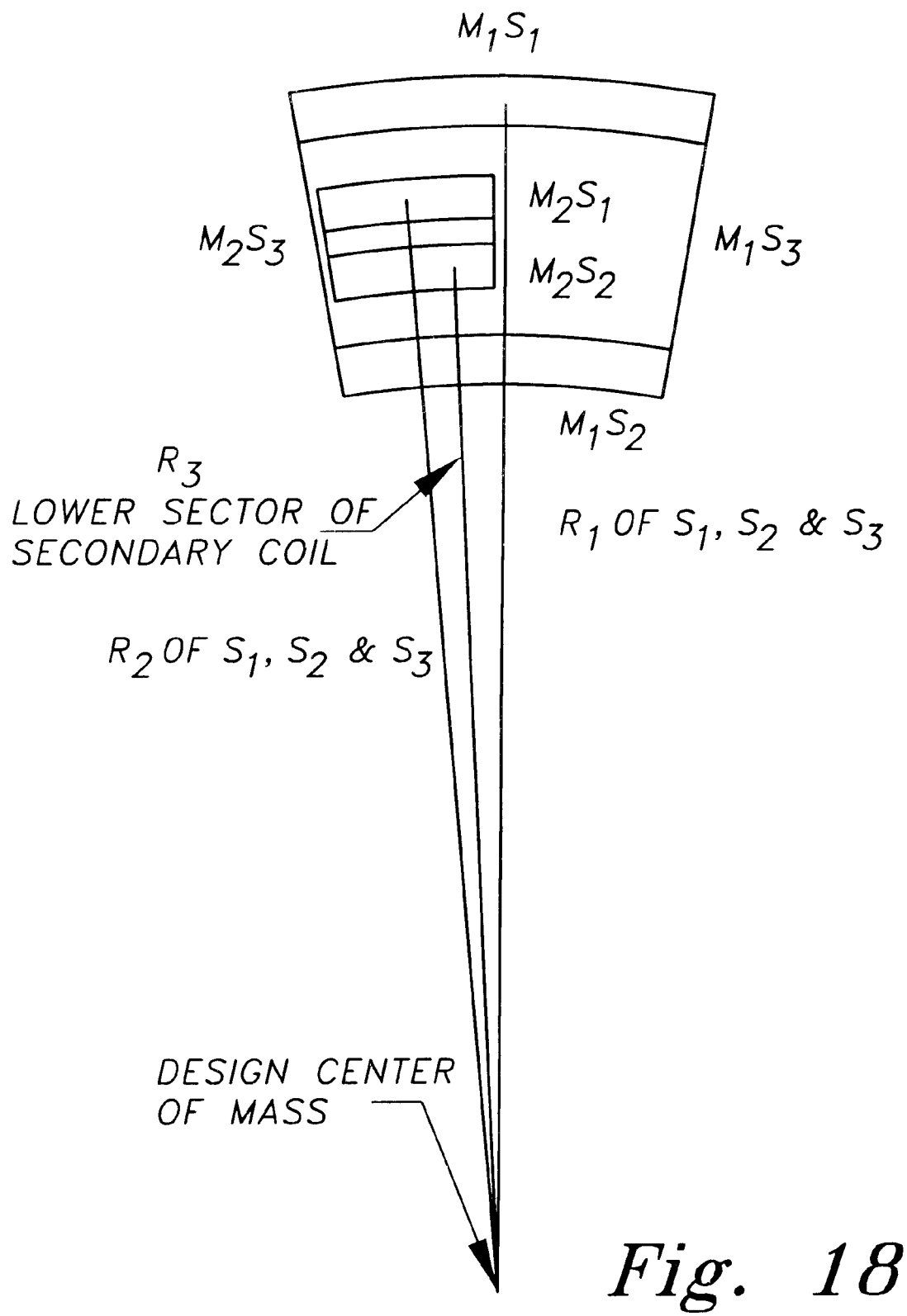
FIG. 18 is a diagrammatic, fragmentary view defining some of the variables used in the calculation of the motion of the electromagnetic machine of the present invention.
Figure 19:
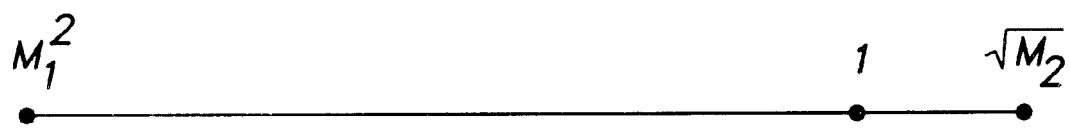
FIG. 19 is a diagrammatic view depicting the neutral point of the magnetic induction on a linear scale.
Figure 20A:
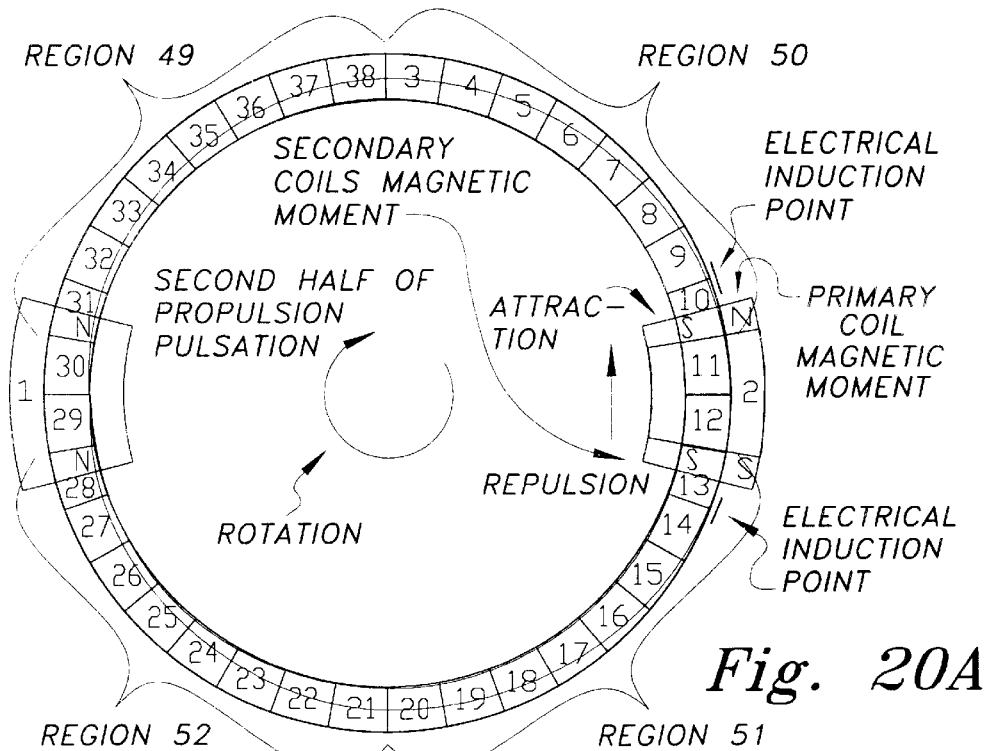
FIG. 20A is a diagrammatic view illustrating the magnetic interactions during a first part of the operating cycle of the electromagnetic machine of the present invention.
Figure 20B:
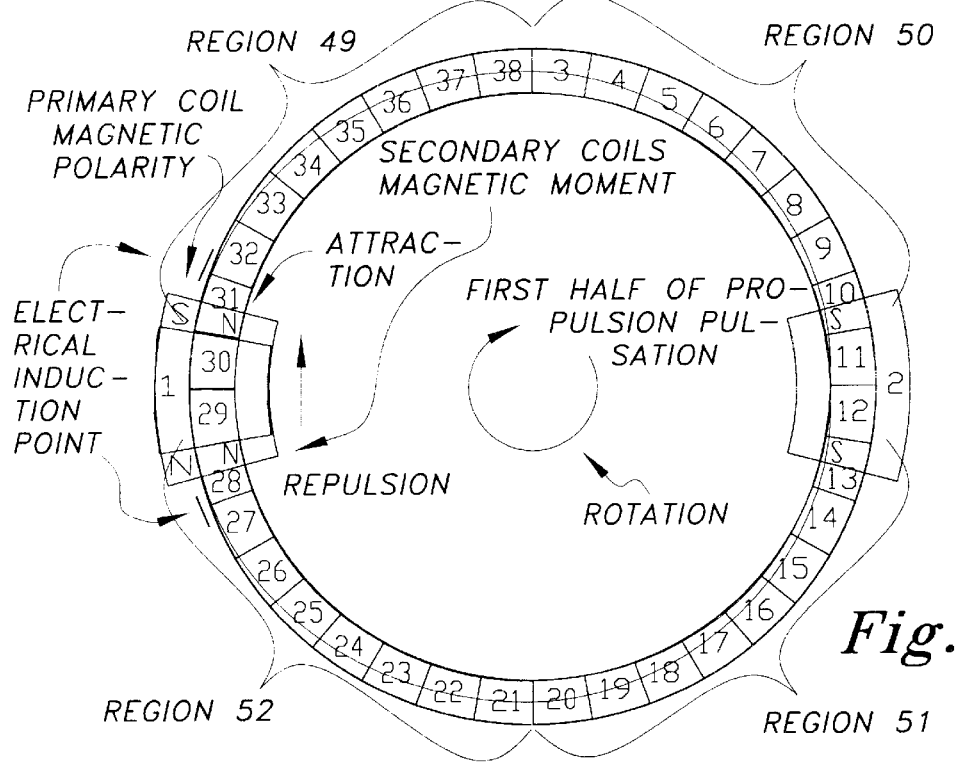
FIG. 20B is a diagrammatic view illustrating the magnetic interactions during a second part of the operating cycle of the electromagnetic machine of the present invention.

Referring to FIGS. 11–14, the third embodiment of the electromagnetic machine 10b can be seen. The electromagnetic machine 10b is generally similar to the electromagnetic machine 10 except for the differences enumerated below. The electromagnetic machine 10b includes an outer casing 12b and an inertia ring 14b. The partitions 20 have been eliminated from the inertia ring 14b. In addition, in place of a series of coils being distributed along the circumference of the core 18, each of the coils 24b overlaps other coils 24b and extends over approximately a 150° sector of the core 18. Referring to FIG. 12, each secondary coil 24b is coded with a different type of shading to illustrate the stepped arrangement of groups of individual coils within each secondary coil 24b. It should be noted that only the outer half of the coils 24b have been shown in FIG. 12.

Consider the secondary coil 24b having the honeycomb shading. Each coil 24b starts with a first group of windings which are at the maximum distance from the core 18. The next group of windings which are also part of the same secondary coil 24b are wound at a distance closer to the core 18. This stepping down of the distance from the core 18 is continued until the windings of the particular secondary coil 24b are at their closest possible distance to the core 18. Then the distance of the windings of the secondary coil 24b from the core 18 is stepped up until once again a group of the windings of the coil 24b having the honeycomb shading are once again at the maximum possible distance from the core 18. This stepped arrangement allows the coils 24b to overlap while allowing each coil 24b to make contact with brushes such as brush 54.

The arrangement of the secondary coils 24b allows half of the brushes 52, 54, 56, 58, 64, 66, 68, and 70 to be eliminated. Instead of each coil 24b being energized by a pair of brushes located side by side, each coil 24b is energized by a pair of brushes located such that one of the pair of brushes is near the primary coil 36 while the other one of the pair of brushes is near the primary coil 38. For example, the secondary coil 24b having the honeycomb shading could be energized by simultaneous contact with the brush 54 and the brush 68. Otherwise the operation of the electromagnetic machine 10b is identical to that of the electromagnetic machine 10.

An explanation of the theory of operation of the present invention is appended hereto as Appendix I.

It is to be understood that the present invention is not limited to the sole embodiments described above, but encompasses any and all embodiments within the scope of the following claims.

I claim:

1. An electromagnetic machine for using electrical energy to generate a propulsive force, the electromagnetic machine comprising:

an outer casing, said outer casing being ring shaped and having a hollow interior;

an inertia ring rotatably supported within said outer casing such that said inertia ring is essentially concentric with said outer casing as said inertia ring rotates within said hollow interior of said outer casing relative to said outer casing, said inertia ring having a circumferential axis, said inertia ring having a core extending along said circumferential axis thereof, said core defining an enclosed perimeter, said inertia ring further having a plurality of secondary coils distributed circumferentially therearound, each of said plurality of secondary coils having a plurality of secondary coil windings which surround said core such that each of said plurality of secondary coil windings of each of said plurality of secondary coils passes through the enclosed perimeter defined by said core;

a primary coil having a plurality of primary coil windings, said primary coil being supported by said outer casing such that said primary coil surrounds an arc-shaped portion of said inertia ring and each of said plurality of primary coil windings passing through said inertia ring;

a first pair of brushes supported by said outer casing, said first pair of brushes electrically energizing each of said plurality of secondary coils in sequence as each of said plurality of secondary coils passes said first pair of brushes as said inertia ring rotates relative to said outer casing, said first pair of brushes energizing each of said plurality of secondary coils with a first polarity;

a second pair of brushes supported by said outer casing, said second pair of brushes electrically energizing each of said plurality of secondary coils in sequence as each of said plurality of secondary coils passes said second pair of brushes as said inertia ring rotates relative to said outer casing, said second pair of brushes energizing each of said plurality of secondary coils with a second polarity which is opposite of said first polarity; and a pair of terminals electrically connected to said primary coil to thereby allow said primary coil to be electrically energized with said first polarity, whereby each of said plurality of secondary coils energized with said first polarity is attracted to said primary coil and each of said plurality of secondary coils energized with said second polarity is repelled by said primary coil to thereby cause the rotation of the inertia ring relative to said outer casing such that each of said plurality of secondary coils sequentially passes said first pair of brushes, said primary coil, and said second pair of brushes as said inertia ring rotates relative to said outer casing.

2. The electromagnetic machine according to claim 1, further including:

a plurality of pairs of contact pads, one pair of said plurality of pairs of contact pads being provided for each of said plurality of secondary coils, each pair of said plurality of pairs of contact pads being electrically connected to a respective one of said plurality of secondary coils to thereby allow each of said plurality of secondary coils to be energized when a respective pair of said plurality of pairs of contact pads contacts a pair of brushes selected from the group consisting of said first pair of brushes and said second pair of brushes.

3. The electromagnetic machine according to claim 1, further including:

a layer of high magnetic permeability material positioned intermediate said primary coil and said inertia ring.

4. The electromagnetic machine according to claim 1, further including:

a plurality of sleeves of high magnetic permeability material, each of said plurality of sleeves of high magnetic permeability material being positioned intermediate a respective one of said plurality of secondary coils and said core.

5. The electromagnetic machine according to claim 1, wherein said inertia ring has an outermost surface, the electromagnetic machine further comprising:

a pair of endless and parallel roller bearing tracks extending around said outermost surface of said inertia ring; and a plurality of roller bearings rotationally supported by said outer casing and engaging said pair of roller bearing tracks to thereby support said inertia ring within said outer casing in a manner which provides for a reduced frictional resistance to rotational motion of said inertia ring within said outer casing.

6. The electromagnetic machine according to claim 1, wherein said primary coil is a first primary coil, the electromagnetic machine further comprising:

a second primary coil having a plurality of second primary coil windings, said second primary coil being supported by said outer casing on a side of said outer casing opposite said first primary coil, said second primary coil surrounding an arc-shaped portion of said inertia ring and each of said plurality of second primary coil windings passing through said inertia ring;

a third pair of brushes supported by said outer casing, said third pair of brushes electrically energizing each of said plurality of secondary coils in sequence as each of said plurality of secondary coils passes said third pair of brushes as said inertia ring rotates relative to said outer casing, said third pair of brushes energizing each of said plurality of secondary coils with said second polarity;

a fourth pair of brushes supported by said outer casing, said fourth pair of brushes electrically energizing each of said plurality of secondary coils in sequence as each of said plurality of secondary coils passes said fourth pair of brushes as said inertia ring rotates relative to said outer casing, said fourth pair of brushes energizing each of said plurality of secondary coils with said first polarity; and a second pair of terminals electrically connected to said second primary coil to thereby allow said primary coil to be electrically energized with said second polarity, whereby each of said plurality of secondary coils energized with said second polarity is attracted to said second primary coil and each of said plurality of secondary coils energized with said first polarity is repelled by said second primary coil to thereby cause the rotation of said inertia ring relative to said outer casing.

7. An electromagnetic machine for using electrical energy to generate a propulsive force, the electromagnetic machine comprising:

an outer casing, said outer casing being ring shaped and having a hollow interior;

an inertia ring rotatably supported within said outer casing such that said inertia ring is essentially concentric with said outer casing as said inertia ring rotates within said hollow interior of said outer casing relative to said outer casing, said inertia ring having a circumferential axis, said inertia ring having a permanent magnet core extending along said circumferential axis thereof;

a first adjacent pair of primary coils each having a plurality of primary coil windings, each of said first adjacent pair of primary coils being supported by said outer casing such that each of said first adjacent pair of primary coils surrounds an arc-shaped portion of said inertia ring and each of said plurality of primary coil windings of each of said first adjacent pair of primary coils passing through said inertia ring;

a first pair of terminals electrically connected to a first one of said first adjacent pair of primary coils to thereby allow said first one of said first adjacent pair of primary coils to be electrically energized; and a second pair of terminals electrically connected to a second one of said first adjacent pair of primary coils to thereby allow said second one of said first adjacent pair of primary coils to be electrically energized, whereby flow of electrical energy to said first adjacent pair of primary coils can be controlled to cause the rotation of the inertia ring relative to said outer casing.

8. The electromagnetic machine according to claim 7, further including:

a pair of sleeves of high magnetic permeability material, each of said pair of sleeves being positioned intermediate a respective one of said first adjacent pair of primary coils and said inertia ring.

9. The electromagnetic machine according to claim 7, wherein said inertia ring has an outermost surface, the electromagnetic machine further comprising:

a pair of endless and parallel roller bearing tracks extending around said outermost surface of said inertia ring; and a plurality of roller bearings rotationally supported by said outer casing and engaging said pair of roller bearing tracks to thereby support said inertia ring within said outer casing in a manner which provides for a reduced frictional resistance to rotational motion of said inertia ring within said outer casing.

10. The electromagnetic machine according to claim 7, further comprising:

a second adjacent pair of primary coils each having a plurality of primary coil windings, each of said second adjacent pair of primary coils being supported by said outer casing on a side of said outer casing opposite said first adjacent pair of primary coils, said second adjacent pair of primary coils surrounding an arc-shaped portion of said inertia ring and each of said plurality of primary coil windings of each of said second adjacent pair of primary coils passing through said inertia ring;

a third pair of terminals electrically connected to a first one of said second adjacent pair of primary coils to thereby allow said first one of said second adjacent pair of primary coils to be electrically energized; and a fourth pair of terminals electrically connected to a second one of said second adjacent pair of primary coils to thereby allow said second one of said second adjacent pair of primary coils to be electrically energized.

11. An electromagnetic machine for using electrical energy to generate a propulsive force, the electromagnetic machine comprising:

an outer casing, said outer casing being ring shaped and having a hollow interior;

an inertia ring rotatably supported within said outer casing such that said inertia ring is essentially concentric with said outer casing as said inertia ring rotates within said hollow interior of said outer casing relative to said outer casing, said inertia ring having a circumferential axis, said inertia ring having a core extending along said circumferential axis thereof, said core defining an enclosed perimeter, said inertia ring further having a plurality of secondary coils wound in a stepped overlapping manner and distributed circumferentially along said core, each of said plurality of secondary coils having a plurality of secondary coil windings which surround said core such that each of said plurality of secondary coil windings of each of said plurality of secondary coils passes through the enclosed perimeter defined by said core;

a primary coil having a plurality of primary coil windings, said primary coil being supported by said outer casing such that said primary coil surrounds an arc-shaped portion of said inertia ring and each of said plurality of primary coil windings passing through said inertia ring;

a first pair of brushes supported by said outer casing, said first pair of brushes electrically energizing each of said plurality of secondary coils in sequence as each of said plurality of secondary coils passes said first pair of brushes as said inertia ring rotates relative to said outer casing, said first pair of brushes energizing each of said plurality of secondary coils with a first polarity;

a second pair of brushes supported by said outer casing, said second pair of brushes electrically energizing each of said plurality of secondary coils in sequence as each of said plurality of secondary coils passes said second pair of brushes as said inertia ring rotates relative to said outer casing, said second pair of brushes energizing each of said plurality of secondary coils with a second polarity which is opposite of said first polarity; and a pair of terminals electrically connected to said primary coil to thereby allow said primary coil to be electrically energized with said first polarity, whereby each of said plurality of secondary coils energized with said first polarity is attracted to said primary coil and each of said plurality of secondary coils energized with said second polarity is repelled by said primary coil to thereby cause the rotation of the inertia ring relative to said outer casing such that each of said plurality of secondary coils sequentially passes said first pair of brushes, said primary coil, and said second pair of brushes as said inertia ring rotates relative to said outer casing.

12. The electromagnetic machine according to claim 11, further including:

a plurality of pairs of contact pads, one pair of said plurality of pairs of contact pads being provided for each of said plurality of secondary coils, each pair of said plurality of pairs of contact pads being electrically connected to a respective one of said plurality of secondary coils to thereby allow each of said plurality of secondary coils to be energized when a respective pair of said plurality of pairs of contact pads contacts a pair of brushes selected from the group consisting of said first pair of brushes and said second pair of brushes.

13. The electromagnetic machine according to claim 11, further including:

a layer of high magnetic permeability material positioned intermediate said primary coil and said inertia ring.

14. The electromagnetic machine according to claim 11, wherein said inertia ring has an outermost surface, the electromagnetic machine further comprising:

a pair of endless and parallel roller bearing tracks extending around said outermost surface of said inertia ring; and a plurality of roller bearings rotationally supported by said outer casing and engaging said pair of roller bearing tracks to thereby support said inertia ring within said outer casing in a manner which provides for a reduced frictional resistance to rotational motion of said inertia ring within said outer casing.

15. The electromagnetic machine according to claim 11, wherein said primary coil is a first primary coil, the electromagnetic machine further comprising:

a second primary coil having a plurality of second primary coil windings, said second primary coil being supported by said outer casing on a side of said outer casing opposite said first primary coil, said second primary coil surrounding an arc-shaped portion of said inertia ring and each of said plurality of second primary coil windings passing through said inertia ring; and a second pair of terminals electrically connected to said second primary coil to thereby allow said primary coil to be electrically energized with said second polarity, whereby each of said plurality of secondary coils energized with said second polarity is attracted to said second primary coil and each of said plurality of secondary coils energized with said first polarity is repelled by said second primary coil to thereby cause the rotation of said inertia ring relative to said outer casing.

* * * * *